(12) United States Patent
Yamaguchi et al.

(10) Patent No.: US 9,568,683 B2
(45) Date of Patent: Feb. 14, 2017

(54) OPTICAL FIBER CONNECTION STRUCTURE AND OPTICAL FIBER CONNECTOR

(71) Applicant: FUJIKURA LTD., Tokyo (JP)

(72) Inventors: Takashi Yamaguchi, Sakura (JP); Takaharu Matsuda, Sakura (JP); Kazuhiro Takizawa, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/848,548

(22) Filed: Sep. 9, 2015

(65) Prior Publication Data

US 2016/0077286 A1 Mar. 17, 2016

(30) Foreign Application Priority Data

Sep. 11, 2014 (JP) ................................ 2014-185447

(51) Int. Cl.
*G02B 6/255* (2006.01)
*G02B 6/38* (2006.01)
*G02B 6/26* (2006.01)

(52) U.S. Cl.
CPC ............. *G02B 6/3803* (2013.01); *G02B 6/262* (2013.01); *G02B 6/264* (2013.01)

(58) Field of Classification Search
CPC ........ G02B 6/3803; G02B 6/262; G02B 6/264
USPC ................. 385/73, 78, 53, 123, 98
See application file for complete search history.

(56) References Cited

U.S. PATENT DOCUMENTS

| | | | | |
|---|---|---|---|---|
| 4,629,284 A | * | 12/1986 | Malavieille | .......... G02B 6/4441 385/70 |
| 4,634,216 A | * | 1/1987 | Calevo | ................. G02B 6/3802 385/59 |
| 5,125,057 A | * | 6/1992 | Aberson, Jr. | ........ G02B 6/3806 385/136 |
| 7,376,315 B2 | * | 5/2008 | Kurosawa | .......... G02B 6/02347 385/123 |

(Continued)

FOREIGN PATENT DOCUMENTS

CN 101210981 A 7/2008
CN 102841411 A 12/2012

(Continued)

OTHER PUBLICATIONS

"F04 Type Connectors for Optical Fiber Cables (Type SC Connectors)," Japanese Industrial Standards, JIS C 5973, 2014, pp. 1-3, & 24.

(Continued)

*Primary Examiner* — Ellen Kim
(74) *Attorney, Agent, or Firm* — Sughrue Mion, PLLC

(57) ABSTRACT

An optical fiber connection structure is provided, in which a first optical fiber and a second optical fiber, which is optically connected to the first optical fiber via a solid refractive index-matching material which is provided on a tip surface of the first optical fiber, are held and fixed between a base member and a cover member, a tip of the second optical fiber is disposed so as to come into contact with the solid refractive index matching material or separated from the solid refractive index-matching material, and the entire solid refractive index matching material and the tip of the second optical fiber are disposed in a liquid refractive index matching agent which is provided between the base member and the cover member.

6 Claims, 8 Drawing Sheets

(56) References Cited

U.S. PATENT DOCUMENTS

| | | | |
|---|---|---|---|
| 7,703,989 B2* | 4/2010 | Kato | G02B 6/3846 385/73 |
| 7,771,128 B2* | 8/2010 | Kojima | G02B 6/255 385/53 |
| 7,857,525 B2* | 12/2010 | Suzuki | G02B 6/3846 385/27 |
| 8,480,314 B2* | 7/2013 | Saito | G02B 6/3862 385/95 |
| 2001/0001623 A1* | 5/2001 | Inada | G02B 6/255 385/99 |
| 2002/0118945 A1 | 8/2002 | Tanako | |
| 2003/0185520 A1* | 10/2003 | Bookbinder | G02B 6/3813 385/73 |
| 2005/0213893 A1 | 9/2005 | Hamasaki et al. | |
| 2007/0196055 A1 | 8/2007 | Kato et al. | |
| 2008/0159696 A1 | 7/2008 | Suzuki et al. | |
| 2010/0086265 A1* | 4/2010 | Kojima | G02B 6/255 385/98 |
| 2010/0220960 A1 | 9/2010 | Ohtsuka et al. | |
| 2010/0310214 A1* | 12/2010 | Miyadera | G02B 6/3636 385/91 |
| 2011/0293222 A1 | 12/2011 | Sumida et al. | |

FOREIGN PATENT DOCUMENTS

| | | |
|---|---|---|
| JP | 63-038905 A | 2/1988 |
| JP | 2000-121863 A | 4/2000 |
| JP | 2007-225722 A | 9/2007 |
| JP | 2008-164795 A | 7/2008 |
| JP | 2011-033731 A | 2/2011 |
| TW | 200535483 A | 11/2005 |
| TW | I242659 B | 11/2005 |
| TW | 200941054 A | 10/2009 |
| TW | 201346370 A | 11/2013 |
| WO | 2010/092654 A1 | 8/2010 |
| WO | 2013158990 A1 | 10/2013 |

OTHER PUBLICATIONS

"F14 Type connectors for optical fiber cables (Type MU connector)," Japanese Industrial Standards, JIS C 5983, 2014, p. 1.

Communication dated Jun. 24, 2016, issued by the Intellectual Property Office of Taiwan in corresponding Taiwanese Application No. 104129156.

* cited by examiner

OPTICAL FIBER CONNECTION STRUCTURE AND OPTICAL FIBER CONNECTOR

INCORPORATION BY REFERENCE

Priority is claimed on Japanese Patent Application No. 2014-185447, filed on Sep. 11, 2014, the content of which is incorporated herein by reference.

BACKGROUND OF THE INVENTION

Field of the Invention

The present invention relates to an optical fiber connection structure and an optical fiber connector which optically connect optical fibers to each other.

Description of Related Art

A so-called field assembly optical connector as an optical connector which allows assembly work to be easily performed with respect to a tip of an optical fiber on site is well known. In the related art, as a field assembly optical connector, a field assembly optical connector is known which includes a short optical fiber (bare optical fiber, and hereinafter, also referred to as a built-in optical fiber) which is inwardly inserted into and fixed to a ferrule, and a mechanical splice type clamp portion which is provided on a rear side opposite to a front end surface of the ferrule for butting (for example, refer to FIGS. 2 to 5 of Japanese Unexamined Patent Application, First Publication No. 2011-33731).

The clamp portion of the field assembly optical connector includes a base member, a cover member, and a plate spring which elastically biases the cover member toward the base member. A rear end portion of the built-in optical fiber is disposed between the base member and the cover member of the clamp portion. Another optical fiber (for example, an optical fiber core wire, and hereinafter, also referred to as an insertion optical fiber), which is inserted between the base member and the cover member of the clamp portion from a rear side opposite to the ferrule side, can be butt-connected to a rear end of the built-in optical fiber. In the field assembly optical connector, the rear end portion of the built-in optical fiber, and a tip portion of the insertion optical fiber which is butt-connected to the rear end of the built-in optical fiber are held between the base member and the cover member of the clamp portion so as to be fixed by elasticity of the plate spring, and the rear end portion of the built-in optical fiber is assembled to the tip of the insertion optical fiber.

In the field assembly optical connector, in order to decrease connection loss, a liquid refractive index matching agent such as silicone-based grease is provided on a butt-connection portion between the built-in optical fiber and the insertion optical fiber (for example, refer to FIG. 16(c) of Japanese Unexamined Patent Application, First Publication No. 2011-33731)

In addition, in the field assembly optical connection, it is suggested that a light-transmitting solid refractive index matching material formed of a polymer material be provided on the rear end of the built-in optical fiber, and the insertion optical fiber and the built-in optical fiber having tips abutting on the solid refractive index matching material be optically connected to each other via the solid refractive index matching material (for example, refer to FIGS. 7(a) and 7(b) or the like of Japanese Unexamined Patent Application, First Publication No. 2011-33731).

In general, a rear end surface (an end surface of a rear end side opposite to the tip exposed to a joining end surface of the ferrule) of the built-in optical fiber of the field assembly optical connector is configured of a flat surface perpendicular to an optical axis of the built-in optical fiber. Meanwhile, a coating material of the tip of the insertion optical fiber is removed on site, the bare optical fiber is led out, the tip of the bare optical fiber is cut, thereafter, the tip of the bare optical fiber is inserted into the clamp portion from the rear side of the clamp portion, and the tip of the bare optical fiber is butted to the rear end of the built-in optical fiber. Cutting of the bare optical fiber (hereinafter, also referred to as an insertion-side bare optical fiber) is performed using a dedicated cleaver (cutter), and a flat mirror-shaped tip surface perpendicular to the optical axis of the bare optical fiber is formed on the bare optical fiber. However, cutting of the insertion side bare optical fiber may not be correctly performed on site, and irregularities may be formed on the tip of the insertion side bare optical fiber.

In the configuration in which the liquid refractive index matching agent is provided in the butt-connection portion between the built-in optical fiber and the insertion optical fiber, a portion between the tip of the insertion side bare optical fiber on which irregularities are formed and the rear end surface of the built-in optical fiber abutting on the tip of the insertion side bare optical fiber can be embedded with the liquid refractive index matching agent. As a result, it is possible to decrease connection loss.

However, in this case, concave portions of the irregularities on the tip of the insertion side bare optical fiber abut on an edge portion on an outer circumference of the rear end surface of the built-in optical fiber, cracks occur on the edge portion, and deterioration of mechanical characteristics of the rear end of the built-in optical fiber may occur. In addition, fragments generated by the cracks are interposed between the built-in optical fiber and the insertion side bare side optical fiber, and the fragments may obstruct the butt-connection.

In the configuration in which the solid refractive index matching material is provided on the rear end of the built-in optical fiber of the field assembly optical connector, it is possible to allow the solid refractive index matching material to function as a cushion layer. Accordingly, in this configuration, since the portion between the tip of the insertion side bare optical fiber on which irregularities are formed and the rear end surface of the built-in optical fiber can be embedded with the solid refractive index matching material, it is possible to realize an optical connection having low loss. In addition, since the solid refractive index matching material functioning as the cushion layer abuts on the convex portion of the tip of the insertion side bare optical fiber, cracks in the edge portion on the outer circumference of the rear end surface of the built-in optical fiber are effectively prevented from occurring.

However, in the configuration in which the solid refractive index matching material is provided on the rear end of the built-in optical fiber of the field assembly optical connector, when air is interposed between a core portion (or a mode field diameter portion) of the tip of the insertion side bare optical fiber particularly, and the solid refractive index matching material, connection loss is greatly influenced, and an optical connection cannot be performed. Accordingly, in this configuration, it is necessary to press the tip of the insertion side bare optical fiber to the refractive index matching material so as to securely come into close contact with each other. However, when close contact of the tip of the insertion side bare optical fiber with respect to the solid refractive index matching material is held and the field assembly optical connection is assembled to the tip of the insertion optical fiber, the tip of the insertion side bare optical fiber may be separated from the solid refractive index matching material due to unexpected tension of the insertion optical fiber 1 or the like, and operation may need to be performed again.

The present invention is made in consideration of the above-described problems, and is to provide an optical fiber connection structure and an optical fiber connector capable of preventing the occurrence of cracks in optical fibers due to abutment of optical fibers in a clamp portion, and of easily improving efficiency of an operation of optically connecting the optical fibers to each other in the clamp portion and holding and fixing the optical fibers.

SUMMARY OF THE INVENTION

The first aspect of the present invention is an optical fiber connection structure, in which a first optical fiber and a second optical fiber, which is optically connected to the first optical fiber via a solid refractive index matching material which is provided on a tip surface of the first optical fiber, are held and fixed between a base member and a cover member, a tip of the second optical fiber is disposed so as to come into contact with the solid refractive index matching material or be separated from the solid refractive index matching material, and the entire solid refractive index matching material, and the tip of the second optical fiber are disposed in a liquid refractive index matching agent which is provided between the base member and the cover member.

The second aspect of the present invention is that, in the optical fiber connection structure of the first aspect, the solid refractive index matching material is formed in a partially spherical shape, and an apex of the partially spherical shape is positioned on an optical axis of a tip of the first optical fiber.

The third aspect of the present invention is an optical fiber connector including: a fiber-fixing portion; a first optical fiber which is fixed to the fiber-fixing portion; a clamp portion which holds and fixes an extended portion of the first optical fiber, which extends from the fiber-fixing portion, between a base member and a cover member which can be opened and closed with respect to the base member; a solid refractive index matching material which is provided on a tip surface of the extended portion of the first optical fiber; and a liquid refractive index matching agent which is provided between the base member and the cover member and buries the solid refractive index matching material, in which a second optical fiber, which is inserted between the base member and the cover member of the clamp portion and in which a tip is disposed in the liquid refractive index matching agent, is configured to be optically connected to the first optical fiber via the solid refractive index matching material.

The fourth aspect of the present invention is that, in the optical fiber connector of the third aspect, the fiber-fixing portion is a ferrule to which the first optical fiber is inwardly inserted and fixed, and the base member of the clamp portion is integrally provided on the ferrule.

The fifth aspect of the present invention, in the optical fiber connector of the third or fourth aspect, the solid refractive index matching material is formed in a partially spherical shape, and an apex of the partially spherical shape is positioned on an optical axis of a tip of the first optical fiber.

According to the aspects of the present invention, due to the solid refractive index matching material provided on the tip of the first optical fiber, even when the tip of the second optical fiber directly abuts on the tip of the first optical fiber, it is possible to prevent the occurrence of cracks on the outer circumference of the tip of the first optical fiber due to the direct abutment.

In addition, in the configuration in which the solid refractive index matching material and the tip of the second optical fiber are disposed in the liquid refractive index matching agent, even when the tip of the second optical fiber is separated from the solid refractive index matching material, it is possible to realize an optical connection between the solid refractive index matching material and the tip of the second optical fiber via the liquid refractive index matching agent. Accordingly, it is not necessarily required that the tip of the second optical fiber come into close contact with the solid refractive index matching material. As a result, it is possible to improve efficiency of an operation of optically connecting the optical fibers to each other in the clamp portion and holding and fixing the optical fibers.

DETAILED DESCRIPTION OF THE PREFERRED EMBODIMENT

Hereinafter, an embodiment of the present invention is described with reference to the drawings.

Figure 1:
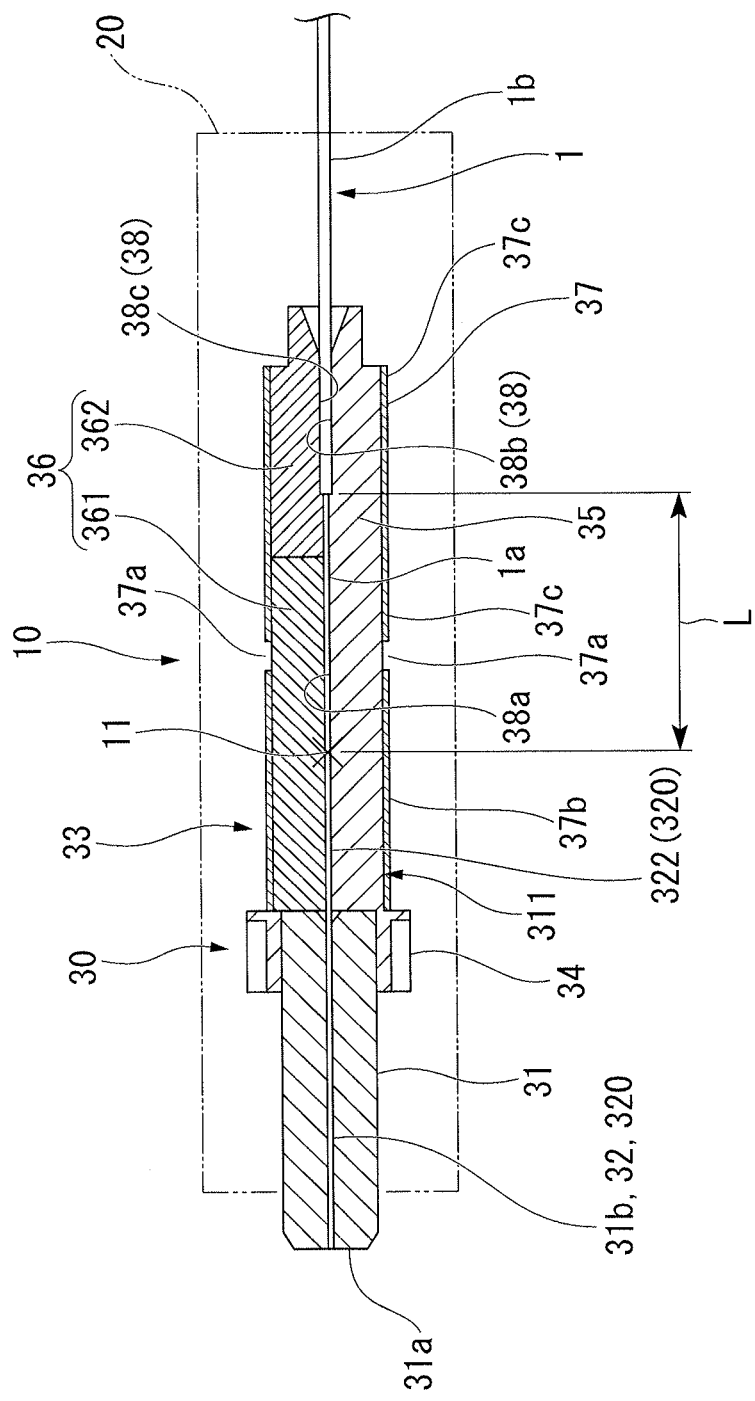
FIG. 1 is a sectional view showing a structure of an optical connector according to one embodiment of an optical fiber connector of the present invention.

An optical connector 10 shown in FIG. 1 is one embodiment in which an optical fiber connector according to the present invention is embodied. The optical connector 10 shown in FIG. 1 has a configuration in which a clamp portion-attached ferrule 30 configured so that a clamp portion 33 is assembled to a rear side (a side opposite to a joining end surface 31a of a front end, and the right side in FIG. 1) of a ferrule 31 is accommodated in a sleeve-shaped housing 20.

Figure 2:
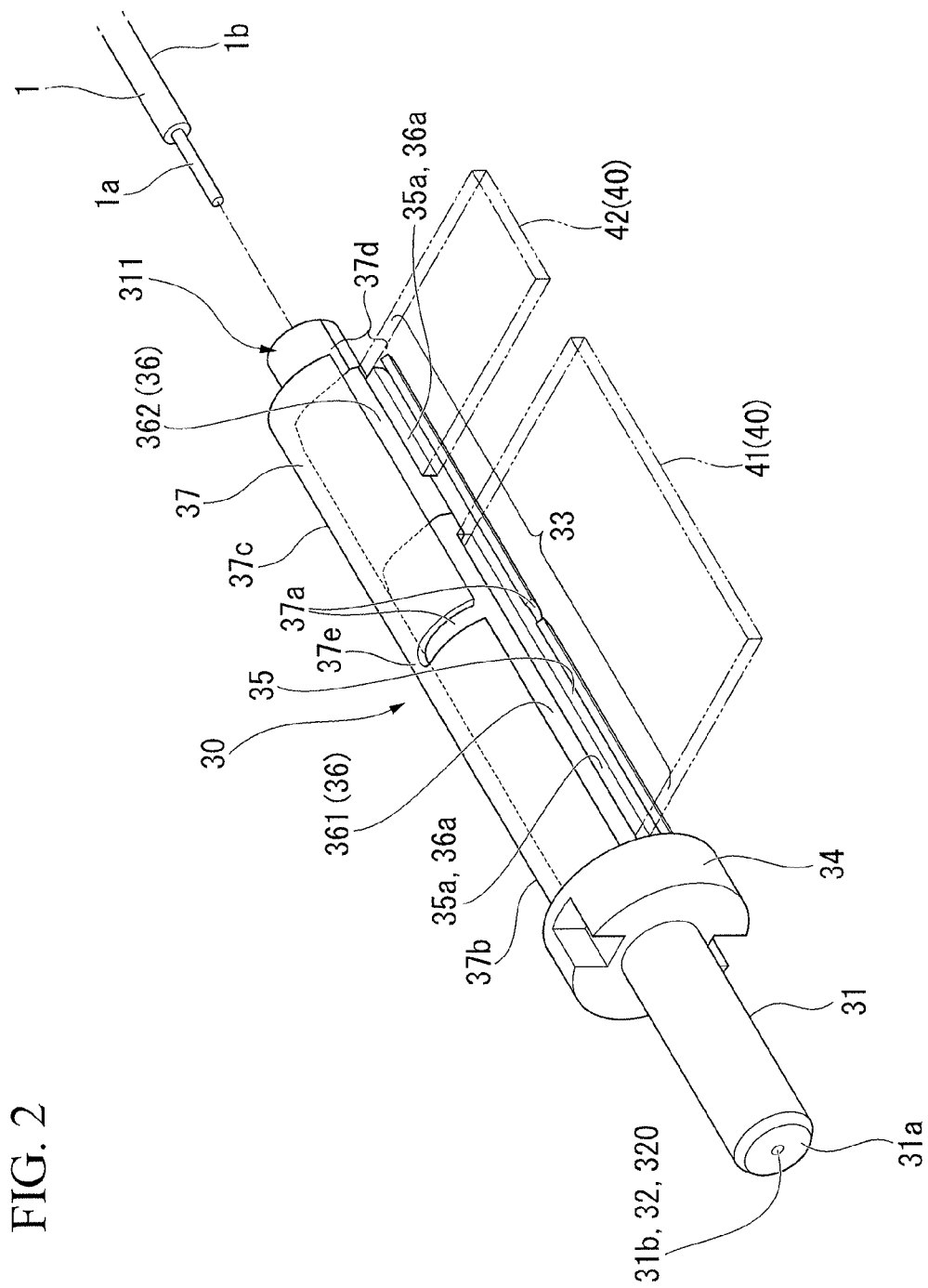
FIG. 2 is a perspective view explaining a structure of a clamp portion-attached ferrule (optical fiber connector) of the optical connector of FIG. 1.

As shown in FIGS. 1 and 2, the clamp portion-attached ferrule 30 is configured so as to include the ferrule 31, a built-in optical fiber 32 (first optical fiber) which is inwardly inserted into and fixed to a fiber hole 31b formed in the ferrule 31, and the clamp portion 33.

Figure 3:
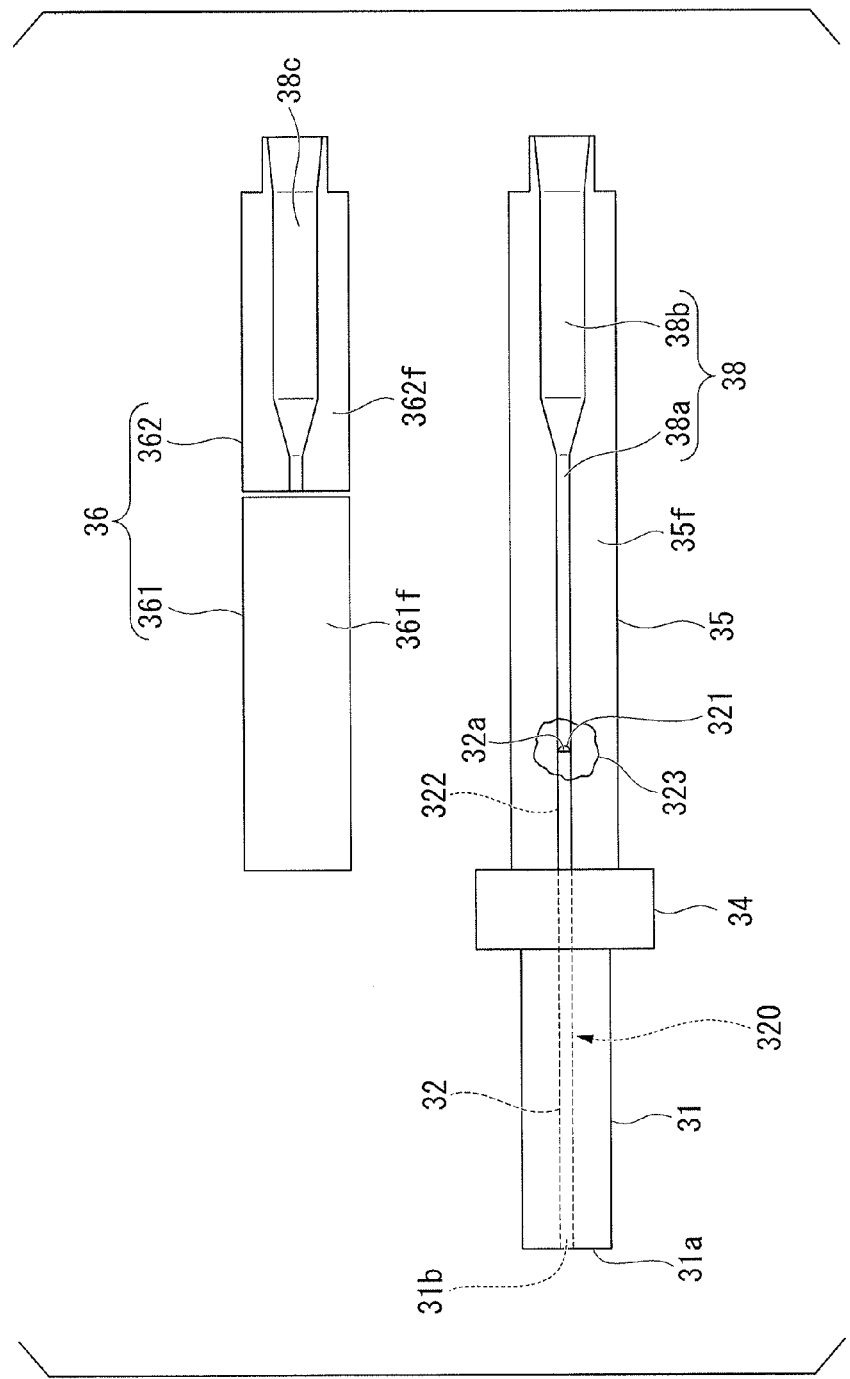
FIG. 3 is an explanatory view showing a schematic structure in a state where opposing surfaces of elements of the clamp portion-attached ferrule (optical fiber connector) in the optical connector of FIG. 1 are arranged side by side.

As shown in FIGS. 1 and 3, the built-in optical fiber 32 has a portion which extends to a rear side of the ferrule 31. In addition, as shown in FIG. 3, a solid refractive index matching material 321 formed of a light-transmitting polymer material is provided on a tip surface (rear end surface 32a) of the portion extending to the rear side of the ferrule 31 of the built-in optical fiber 32.

Hereafter, an optical fiber (built-in optical fiber 32) in which the solid refractive index matching material 321 is provided on the rear end surface 32a is also referred to as a matching material-attached optical fiber 320.

As shown in FIG. 1, the clamp portion 33 of the clamp portion-attached ferrule 30 holds and fixes a rear end portion of the matching material-attached optical fiber 320 and a tip portion of another optical fiber 1 (second optical fiber) which is optically connected to the built-in optical fiber 32 via the solid refractive index matching material 321 of the rear end of the matching material-attached optical fiber 320, and maintains an optical connection state between the optical fibers 1 and 32.

The clamp portion-attached ferrule 30 functions as an optical fiber connector for optically connecting the optical fibers 1 and 32 to each other. In addition, the optical connector 10 which accommodates the clamp portion-attached ferrule 30 in the housing 20 may be also treated as the optical fiber connector.

For example, the ferrule 31 (ferrule main body) of the clamp portion-attached ferrule 30 shown in FIGS. 1 and 2 is a capillary shaped single-fiber ferrule formed of zirconia ceramics, glass, or the like. The fiber hole 31b of the ferrule 31 is a through-hole which penetrates the inside of the ferrule 31.

For example, as the ferrule 31, for example, a ferrule, which is used in a single-fiber optical connector, such as a SC type optical connector (a SC type optical connector (F04 type optical connection defined by JIS C 5973, SC: Single fiber Coupling optical fiber connector), a MU type optical connector (F14 type optical connector defined by JIS C 5983, MU: Miniature-Unit coupling optical fiber connector), or the like may be used.

As shown in FIGS. 1 and 3, the built-in optical fiber 32 (here, bare optical fiber) includes a front end surface which is positioned at the joining end surface 31a for butt-joining on the front end of the ferrule 31. The front end surface of the built-in optical fiber 32 and the joining end surface 31a of the ferrule 31 are ground.

A portion of the built-in optical fiber 32 which is inwardly inserted into the fiber hole 31b is provided so as to be fixed to the ferrule 31 by adhesion of an adhesive agent, or the like.

The ferrule 31 functions as a fiber-fixing portion which fixes the built-in optical fiber 32 (first optical fiber) in the clamp portion-attached ferrule 30.

As shown in FIGS. 1 and 2, the clamp portion 33 of the clamp portion-attached ferrule 30 has a configuration in which an element portion 331 having a half-split structure including an elongated base side element 35 (base member) and a cover side element 36 (cover member) which extends along the base side member 35 are accommodated and held inside a spring 37 which is formed by processing a metal sheet and extends in a C sectional shape. The spring 37 functions as a biasing member which elastically biases the cover side element 36 toward the base side element 35.

The cover side element 36 of the clamp portion 33 is configured so as to include a first cover side element 361 and a second cover side element 362 which is positioned on a side (rear side) opposite to the ferrule 31 and a flange portion 34 with the first cover side element 361 therebetween. Hereinafter, the first cover side element 361 is also referred to as a front element, and the second cover side element 362 is also referred to as a rear element.

The cover side element (front element 361 and rear element 36) functions as a pressing member which presses the optical fibers 1 and 32 inserted between the cover side element and the base side element 35 to the base side element 35 by elasticity of the spring 37.

A rear side extension portion 322 of the matching material-attached optical fiber 320, which is a portion extending from the ferrule 31 to the rear side, is inserted between the base side element 35 of the clamp portion 33 and the front element 361. The rear end of the matching material-attached optical fiber 320 is positioned at a position corresponding to a center portion of the front element 361 in a front-rear direction (right-left direction in FIGS. 1 and 3) of the clamp portion-attached ferrule 30.

The built-in optical fiber 32 is a short optical fiber which extends from the rear end of the built-in optical fiber 32 disposed between the base side element 35 and the front element 361 of the clamp portion 33 to the front end surface positioned on the joining end surface 31a of the ferrule 31.

Figure 5A:
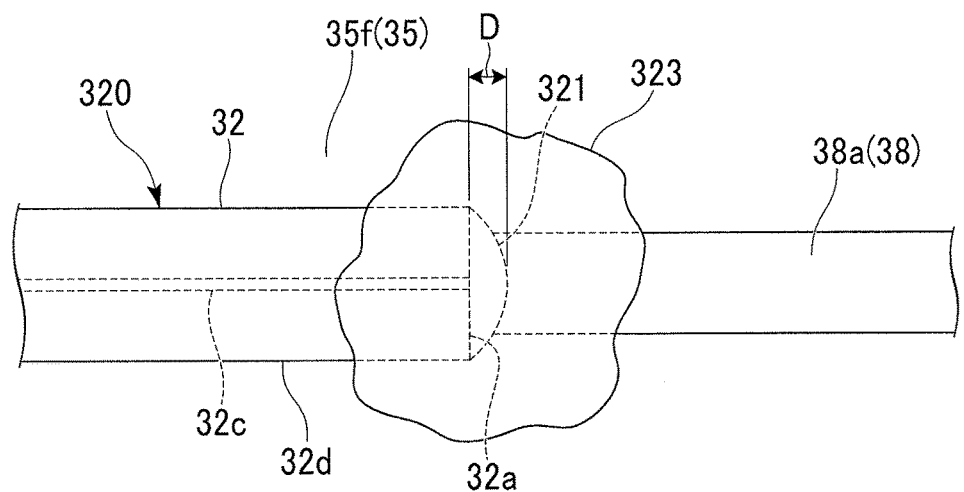
FIG. 5A is a view showing a structure in the vicinities of a solid refractive index matching material and a liquid refractive index matching agent provided in a base member (base side element) of the clamp portion-attached ferrule of FIG. 2.

As shown in FIGS. 3 and 5A, the rear end portion of the matching material-attached optical fiber 320 is embedded in a light-transmitting liquid refractive index matching agent 323 (for example, silicone-based grease) which is provided on a side of the base side element 35 of the clamp portion 33 facing the front element 361.

The clamp portion-attached ferrule 30 includes the solid refractive index matching material 321 and the liquid refractive index matching agent 323.

The base side element 35 of the clamp portion 33 shown in FIGS. 1 to 3 is an extended portion which extends from a ring-shaped flange portion 34 outwardly inserted into and fixed to the rear end portion of the ferrule 31 to the rear side (right side in FIGS. 1 and 3).

The rear side extension portion 322 of the matching material-attached optical fiber 320 is accommodated in an aligning groove 38a, which is formed to extend in the front-rear direction of the clamp portion-attached ferrule 30, on an opposing surface 35f facing the pressing element 36 of the base side element 35. An accommodation state in the aligning groove 38a of the rear side extension portion 322 of the matching material-attached optical fiber 320 can be maintained by stiffness of the built-in optical fiber 32. A portion of the built-in optical fiber 32 is accommodated in a sectional direction (hereinafter, also referred to as a cross-section direction), which is perpendicular to an optical axis of the built-in optical fiber 32, in the aligning groove 38a. A portion of the built-in optical fiber 32, which is not accommodated in the aligning groove 38a in the cross-sectional direction, protrudes from the base side element 35 to the front element 361 side.

The liquid refractive index matching agent 323 shown in FIGS. 3 and 5A is provided so as to be attached at a position corresponding to a center portion of the front element 361 of the base side element 35 of the clamp portion 33 in the front-rear direction (the right-left direction in FIGS. 1, 3, and 5A to 5C) of the clamp portion-attached ferrule 30.

The liquid refractive index matching agent 323 has a viscosity for stably maintaining an attachment state with respect to the base side element 35 without having fluidity with respect to the clamp portion 32 of the optical connector 10 regardless of a connector orientation at a normal temperature (20±15° C.) such as an orientation in which the aligning groove 38a of the base side element 35 extends in a vertical direction.

In FIGS. 3 and 5A, the liquid refractive index matching agent 323 is provided so as to rise toward a side of the base side element 35 facing the front element 361.

As shown in FIGS. 3 and 5A, the entire solid refractive index matching material 321 of the matching material-attached optical fiber 320 is embedded in the liquid refractive index matching agent 323. The liquid refractive index matching agent 323 enters the aligning groove 38a of the base side element 35, buries the entire solid refractive index matching material 321, and covers the rear side (right side in FIGS. 3 and 5A to 5C) of the entire solid refractive index matching material 321. In addition, in FIGS. 3 and 5A, the liquid refractive index matching agent 323 buries not only the solid refractive index matching material 321 but also the rear end portion of the built-in optical fiber 32.

The liquid refractive index matching agent 323 can stably maintain an attachment state of the matching material-attached optical fiber 320 with respect to the solid refractive index matching material 321 regardless of a connector orientation at a normal temperature (20±15° C.).

As shown in FIGS. 1 and 2, the optical fiber 1 which is optically connected to the built-in optical fiber 32 is inserted from a rear side which is opposite to the ferrule side (front side) between elements 35 and 36 of the clamp portion 33 of the clamp portion-attached ferrule 30. Hereinafter, the optical fiber 1 is also referred to as an insertion optical fiber.

As the insertion optical fiber 1, a coated optical fiber is used, in which a resin coating material is coated (covered) on a bare optical fiber referred to as an optical fiber core wire or an optical fiber wire. In a state where a coating of a tip portion of the insertion optical fiber 1 (coated optical fiber) is removed and a bare optical fiber 1a (hereinafter, referred to as an insertion side bare optical fiber) is exposed, the insertion optical fiber 1 is inserted from the rear side of the housing 20 (an end portion opposite to the front side on which the joining end surface 31a of the ferrule 31 is positioned) into a portion between the elements 35 and 36 of the clamp portion 33 of the clamp portion-attached ferrule 30.

Figure 5B:
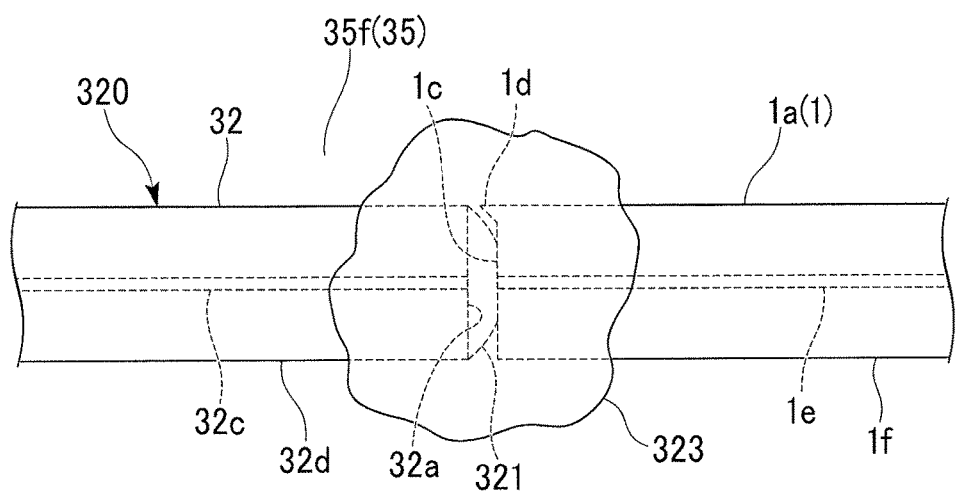
FIG. 5B is a view showing a state where a tip of the insertion optical fiber abuts on the solid refractive index matching material in the liquid refractive index matching agent.

For example, as shown in FIG. 5B, a tip (a tip of the insertion side bare optical fiber 1a) of the insertion optical fiber 1 inserted into a portion between the elements 35 and 36 of the clamp portion 33 abuts on the solid refractive index matching material 321. An optical connection between the insertion optical fiber 1 in which the tip abuts on the solid refractive index matching material 321 and the built-in optical fiber 32 is realized via the solid refractive index matching material 321. As shown in FIG. 51B, the tip of the insertion optical fiber 1 abuts on the solid refractive index matching material 321 in the liquid refractive index matching agent 323. In a state where the tip of the insertion optical fiber 1 is embedded in the liquid refractive index matching agent 323, the tip of the insertion optical fiber 1 abuts on the solid refractive index matching material 321.

The clamp portion 33 of the clamp portion-attached ferrule 30 holds and fixes the rear end portion of the matching material-attached optical fiber 320 and the tip portion of the insertion optical fiber 1 which is optically connected to the built-in optical fiber 32 between the elements 35 and 36 by elasticity of the spring 37. Accordingly, an optical connection state between the built-in optical fiber 32 and the insertion optical fiber 1 can be stably maintained. The rear end portion of the matching material-attached optical fiber 320 and the insertion side bare optical fiber 1a are held and fixed between the base side element 35 and the front element 361.

The insertion side bare optical fiber 1a of the insertion optical fiber 1 inserted into the portion between the elements 35 and 36 of the clamp portion 33 is inserted into the aligning groove 38a (refer to FIGS. 3 to 4B) of the base side element 35. When the aligning groove 38a of the base side element 35 holds and fixes the rear end portion of the matching material-attached optical fiber 320 and the tip portion of the insertion optical fiber 1 which is optically connected to the built-in optical fiber 32 between the elements 35 and 36 by elasticity of the spring 37, the aligning groove 38a of the base side element 35 accurately positions and aligns the rear end portion of the matching material-attached optical fiber 320 and the insertion side bare optical fiber 1a so that the optical axis of the tip of the insertion side bare optical fiber 1a is accurately positioned at the rear end of the built-in optical fiber 32. The aligning groove 38a is a groove which positions and aligns the rear side extension portion 322 of the matching material-attached optical fiber 320 and the insertion side bare optical fiber 1a so as to be butt-connected to each other.

Figure 5C:
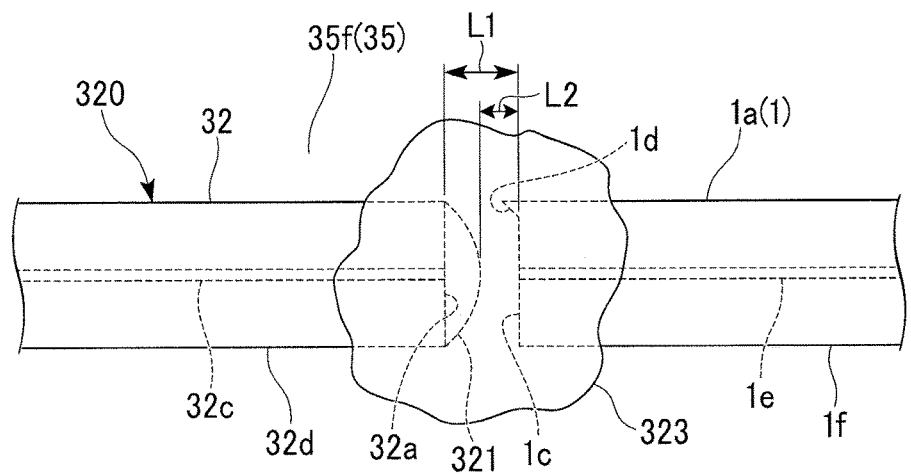
FIG. 5C is a view showing a state where the tip of the insertion optical fiber is disposed so as to be separated from the solid refractive index matching material in the liquid refractive index matching agent.

In addition, as shown in FIG. 5C, in the clamp portion-attached ferrule 30 of the optical connector 10, the tip of the insertion optical fiber 1 (the tip of the insertion side bare optical fiber 1a) inserted into the liquid refractive index matching agent 323 is disposed so as to be separated from the solid refractive index matching material 321, and an optical connection between the insertion optical fiber 1 and the built-in optical fiber 32 can be realized. In this case (in the case of the optical fiber connection structure shown in FIG. 5C), the insertion optical fiber 1 is connected to the built-in optical fiber 32 via the liquid refractive index matching agent 323 which exists between the tip of the insertion optical fiber 1 and the solid refractive index matching material 321, and the solid refractive index matching material 321.

The solid refractive index matching material 321 exemplified in FIGS. 3 and 5A is formed in a partially spherical shape (in a layer of a partially spherical shape) to cover the entire rear end surface 32a of the built-in optical fiber. An apex, at which a protrusion dimension from the rear end surface 32a of the built-in optical fiber of the solid refractive index matching material 321 is the maximum value, is positioned at a virtual extension line of an optical axis in the rear end surface 32a of the built-in optical fiber.

The solid refractive index matching material 321 may be formed in a layer shape which extends with an approximately uniform thickness along the rear end surface 32a of the built-in optical fiber and covers the rear end surface 32a of the built-in optical fiber.

The solid refractive index matching material 321 is formed so that a thickness of a portion which covers a sectional surface of a core portion 32c (or a mode field thickness) of the built-in optical fiber 32 on the rear end surface 32a of the built-in optical fiber is the maximum thickness (or the entire portion has a uniform thickness) of the portion covering the rear end surface 32a of the built-in optical fiber.

In addition, in FIG. 5A, a reference numeral 32d indicates a clad portion of the built-in optical fiber 32.

Preferably, a thickness D (refer to FIG. 5A) of the portion of the solid refractive index matching material 321 which covers the core portion 32c (or the mode field thickness) of the rear end surface 32a of the built-in optical fiber is 20 μm to 60 μm (20 μm or more and 60 μm or less), and more preferably, the thickness D is 20 μm to 50 μm (20 μm or more and 50 μm or less).

More specifically, the thickness D of the solid refractive index matching material 321 is a dimension of a portion of the solid refractive index matching material 321 positioned on the extension of the optical axis of the built-in optical fiber 32 of the rear end surface 32a of the built-in optical fiber in the front-rear direction of the clamp portion-attached ferrule 30.

Moreover, the front-rear direction of the clamp portion-attached ferrule 30 is coincident with the optical axis direction on the rear end surface 32a of the built-in optical fiber 32. The thickness D of the solid refractive index matching material 321 indicates a thickness of the portion which covers the solid refractive index matching material 321 positioned on the extension of the optical axis of the rear end surface 32a of the built-in optical fiber.

Providing a thickness of 20 μm or more with respect to the portion, which covers the rear end surface 32a of the built-in optical fiber of the solid refractive index matching material 321, effectively contributes to securing of cushioning properties of the solid refractive index matching material 321.

When the thickness of the solid refractive index matching material 321 exceeds 60 μm, unintended bending easily occurs on the insertion optical fiber 1 due to elastic deformation of the solid refractive index matching material 321. Accordingly, preferably, the thickness of the solid refractive index matching material 321 is 60 μm or less.

As shown in FIG. 5C, when the insertion optical fiber 1 which is disposed so as to be separated from the solid refractive index matching material 321 toward the rear side is optically connected to the built-in optical fiber 32 in the liquid refractive index matching agent 323, preferably, a maximum value of a separation distance L1 (hereinafter, also referred to as a distance between fiber end surfaces) from the rear end surface 32a of the built-in optical fiber of the tip of the insertion optical fiber 1 (the tip of the insertion side bare optical fiber 1a) is 100 μm to 150 μm.

The distance between fiber end surfaces L1 indicates a separation distance between the core portion 1e of the insertion side bare optical fiber 1a exposed to the tip surface 1c of the insertion optical fiber 1 (the tip surface of the insertion side bare optical fiber 1a) and the rear end of the core portion 32c of the built-in optical fiber 32. More specifically, the distance between fiber end surfaces L1 is a distance between a position of an optical axis in the tip surface of the insertion side bare optical fiber 1a and a position of an optical axis in the rear end surface 32a of the built-in optical fiber 32.

In addition, in FIGS. 5B and 5C, reference numeral 1f indicates a clad portion of the insertion side bare optical fiber 1a.

In addition, in this case, preferably, a distance L2 (refer to FIG. 5C, hereinafter, also referred to as a distance between matching material and fiber) between the tip of the insertion optical fiber 1 (the tip of the insertion side bare optical fiber 1a) and the solid refractive index matching material 321 is 100 μm or less, more preferably, 50 μm or less, and most preferably, 20 μm or less.

More specifically, the distance L2 between matching material and fiber indicates a separation distance in an optical axis direction of the rear end surface 32a of the built-in optical fiber between the position of the optical axis in the tip surface of the insertion side bare optical fiber 1a and a point positioned on the extension of the optical axis of the built-in optical fiber 32 of the rear end surface 32a of the built-in optical fiber on the apex of the solid refractive index matching material 321.

The solid refractive index matching material 321 and the liquid refractive index matching agent 323 use matching materials having the same refractive index as each other.

The solid refractive index matching material 321 and the liquid refractive index matching agent 323 are required to have a refractive index matching property. In this case, the refractive index matching property means a degree of proximity between a refractive index of a light-transmitting material for connection (the solid refractive index matching material 321 and the liquid refractive index matching agent 323) and a refractive index of an optical fiber (the bare optical fiber of the insertion optical fiber 1 and the built-in optical fiber).

The refractive indexes of the solid refractive index matching material 321 and the liquid refractive index matching agent 323 are not particularly limited as long as the refractive indexes are close to the refractive index of the optical fiber. However, preferably, considering transmission loss due to avoidance of Fresnel reflection, differences between the refractive indexes and the refractive index of the optical fiber are within ±0.1, and more preferably, are within ±0.05. In addition, when the refractive index of the bare optical fiber 1a of the insertion optical fiber 1 and the refractive index of the built-in optical fiber 32 are different from each other, preferably, a difference between an average value of the refractive indexes of the optical fibers and the refractive index of the solid refractive index matching material 321 is within the above-described range.

A method of providing the solid refractive index matching material 321 on the rear end surface 32a of the built-in optical fiber is not particularly limited.

For example, the solid refractive index matching material 321 may be a resin film in which a liquid polymer material is applied (printed, sprayed, electrostatically applied, or the like) to the rear end surface 32a of the built-in optical fiber and the coating film is solidified, a deposition film (resin film) which is formed by a Chemical Vapor Deposition (CVD) method or a Physical Vapor Deposition (PVD) method, or the like.

The layered solid refractive index matching material 321 may be configured by allowing a small piece cut into a size suitable for the rear end surface 32a of the built-in optical fiber from a base film (polymer film) to adhere to the rear end surface 32a of the built-in optical fiber. In order to provide the solid refractive index matching material 321 having a partially spherical shape to the rear end surface 32a of the built-in optical fiber, for example, a small piece having a partially spherical shape, which is cut from a base film in which a plurality of portions having partially spherical shapes are formed, may be also used.

In addition, applying a liquid polymer material to the rear ends surface 32a of the built-in optical fiber using electrostatic application or the like does not require precise positioning of a small piece cut from the base film with respect to the rear end surface 32a of the built-in optical fiber, and can form the solid refractive index matching material 321 having a partially spherical shape.

For example, a material of the solid refractive index matching material 321 may include polymer materials such as an acryl-based material, an epoxy-based material, a vinyl-based material, a silicone-based material, a rubber-based material, a urethane-based material, a methacryl-based material, a nylon-based material, a bisphenol-based material, a diol-based material, a polyimide-based material, a fluorinated epoxy-based material, a fluorinated acryl-based, or the like.

As the polymer film, adhesive materials configured of the polymer materials may be formed in film shapes so as to be used, and among the adhesive materials, considering circumstance resistance or adhesion properties, in general, a silicone-based adhesive material or an acryl-based adhesive material may be suitably used.

The insertion side bare optical fiber 1a and the built-in optical fiber 32 are quartz-based optical fibers.

The solid refractive index matching material 321 is a soft layer in which hardness is considerably lower than hardness of the quartz-based optical fiber.

When the solid refractive index matching material 321 abuts on the tip of the bare optical fiber 1a of the insertion optical fiber 1, the solid refractive index matching material 321 functions as a cushion layer which relieves an impact force generated due to the abutment and prevents damage due to cracks between the rear end of the built-in optical fiber 32 and the tip of the insertion side bare optical fiber 1a, or the like.

Figure 7:
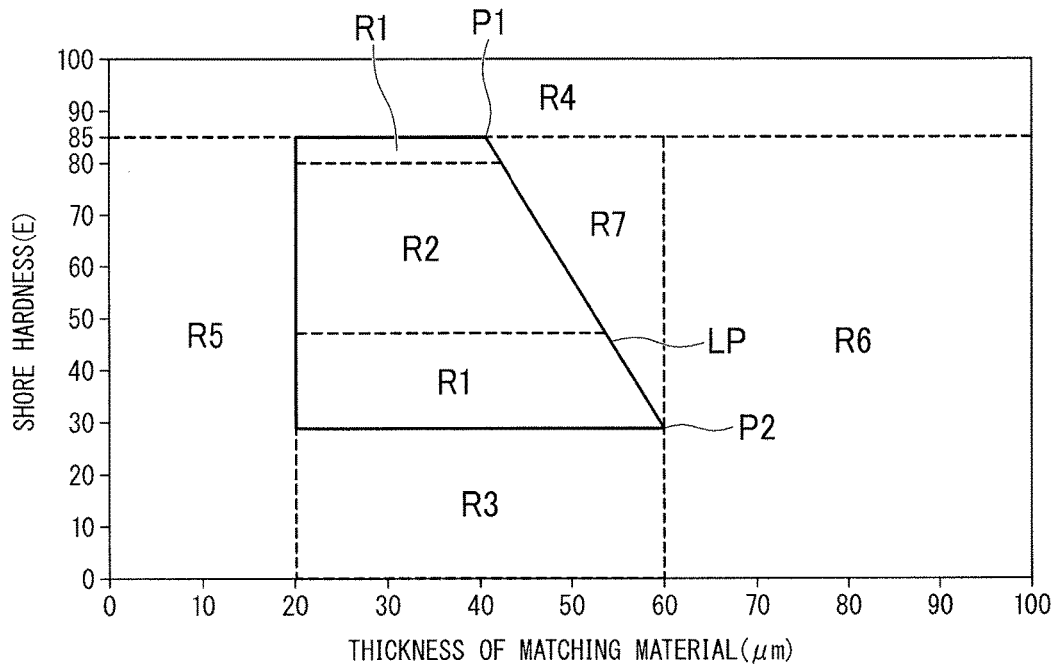
FIG. 7 is a diagram explaining a preferred range of physical properties of the solid refractive index matching material used in one exemplary embodiment of the present invention.

As shown in FIG. 7, preferably, Shore hardness E (based on JIS K 6253) of the solid refractive index matching material 321 is 30 to 85 (30 or more and 85 or less).

When Shore hardness E of the solid refractive index matching material 321 is too low (for example, within a region R3 of FIG. 7), it is not possible to sufficiently obtain effects of relieving an impact force generated due to abutment between the solid refractive index matching material 321 and the tip of the insertion side bare optical fiber 1a. When Shore hardness E is 30 or more, it is possible to prevent an impact force.

For example, if Shore hardness E is 30 or more, even when a great force is applied to the solid refractive index matching material 321 due to positional adjustment between end portions of the optical fibers 2 and 22 in the aligning groove 19a or variation of a temperature or humidity, it is possible to sufficiently obtain effects of relieving an impact force generated due to abutment between the rear end surface 32a of the built-in optical fiber and the tip of the input-side bare optical fiber 1a, and it is possible to prevent damage due to cracks between the rear end of the built-in optical fiber 32 and the tip of the insertion side bare optical fiber 1a, or the like.

Moreover, when Shore hardness E of the solid refractive index matching material 321 is 30 or more, it is possible to prevent deformation such as wrinkle formation causing an increase of loss of the solid refractive index matching material 321.

If Shore hardness E of the solid refractive index matching material 321 is too high (for example, a region R4), when there are irregularities on the tip surface 1c of the insertion side bare optical fiber 1a (refer to FIGS. 5B and 5C or the like), follow-up deformation with respect to the tip surface 1c of the insertion side bare optical fiber is not sufficient, and a location which is separated from the mode field diameter portion on the tip surface 1c of the insertion side bare optical fiber is easily generated in the solid refractive index matching material 321.

When Shore hardness E of the solid refractive index matching material 321 is 85 or less, sufficient follow-up deformation with respect to the tip surface 1c of the insertion side bare optical fiber can be obtained, and a close contact with respect to the mode field diameter portion (including the core portion 1e on the tip surface 1c of the insertion side bare optical fiber) of the tip surface 1c of the insertion side bare optical fiber can be easily realized. In addition, in the solid refractive index matching material 321 having Shore hardness E of 85 or less, since the solid refractive index matching material 321 is deformed following the tip surface 1c of the insertion side bare optical fiber and comes into close contact with the tip surface 1c, even when a temperature or humidity is changed, the solid refractive index matching material 321 is not easily separated from the mode field diameter portion of the tip surface 1c of the insertion side bare optical fiber, and it is possible to maintain a close contact with respect to the mode field diameter portion of the tip surface 1c of the insertion side bare optical fiber.

Preferably, a thickness D of the solid refractive index matching material 321 (refer to FIG. 5A) exceeds 10 μm. Preferably, the thickness D of the solid refractive index matching material 321 is 20 μm to 60 μm (20 μm or more and 60 μm or less).

As shown in FIG. 7, if the solid refractive index matching material 321 is too thin (for example, in a region R5), it is not possible to sufficiently exert effects of relieving an impact force generated due to the abutment of the tip of the insertion side bare optical fiber 1a with respect to the rear end surface 32a of the built-in optical fiber. However, if the thickness D is 20 μm or more, it is possible to sufficiently exert a function as a cushion layer which relieves an impact force generated when the tip of the insertion side bare optical fiber 1a abuts on the rear end surface 32a of the built-in optical fiber.

In addition, since the thickness D is 20 μm or more, it is possible to sufficiently obtain follow-up deformation with respect to the tip surface 1c of the insertion side bare optical fiber, which is advantageous for a close contact with respect to the tip surface 1c of the insertion side bare optical fiber.

If the solid refractive index matching material 321 is too thick (for example, in a region R6 in FIG. 7), deformation of the solid refractive index matching material 321 which presses the tip of the insertion side bare optical fiber 1a increases, a portion or a direction of the tip of the insertion side bare optical fiber 1a in a direction perpendicular to the optical axis of the rear end surface 32a of the built-in optical fiber is not easily stabilized, and alignment accuracy with respect to the rear end of the built-in optical fiber 32 is likely to decrease. In addition, if the solid refractive index matching material 321 is too thick, even after the tip of the insertion side bare optical fiber 1a is pressed to the solid refractive index matching material 321, a position (a position in the direction perpendicular to the optical axis of the rear end surface 32a of the built-in optical fiber), a direction, and alignment accuracy of the tip of the insertion side bare optical fiber 1a with respect to the rear end of the built-in optical fiber 32 are easily changed due to an external force such as vibration, a change of a temperature, or the like acting on the optical connector 10.

When the thickness D of the solid refractive index matching material 321 is 20 μm to 60 μm, it is possible to advantageously maintain stability of the position, the direction, and the alignment accuracy of the tip of the insertion side bare optical fiber 1a with respect to the rear end of the built-in optical fiber 32.

Stability of the position and the direction of the tip of the insertion side bare optical fiber 1a with respect to the rear end of the built-in optical fiber 32 are also influenced by the hardness of the solid refractive index matching material 321.

In FIG. 7, when a straight line which connects a point P1 at which Shore hardness E is 85 and the thickness is 40 μm and a point P2 at which Shore hardness E is 30 and the thickness is 60 μm is defined as a straight line LP, unlike a region (a region R7 or the like) in which the thickness is greater than that of the straight line LP, in a region (region R1 or the like) which includes the straight line LP and in which the thickness is smaller than that of the straight line LP, destabilization of the position and the direction of the tip of the insertion side bare optical fiber 1a with respect to the rear end of the built-in optical fiber 32 is not easily generated.

The solid refractive index matching material 321 can suitably use a matching material in which Shore hardness E is 30 to 85 and the thickness D is 20 μm to 60 μm and which has Shore hardness E and the thickness D of the region (region R1) except for the region R7 in FIG. 7. That is, in FIG. 7, the solid refractive index matching material 321 can suitably use matching materials within a range surrounded by (Shore hardness E; 30 and thickness; 20 μm), (Shore hardness E; 85 and thickness; 20 μm), (Shore hardness E; 85 and thickness; 40 μm), and (Shore hardness E; 30 and thickness; 60 μm).

Figure 8:
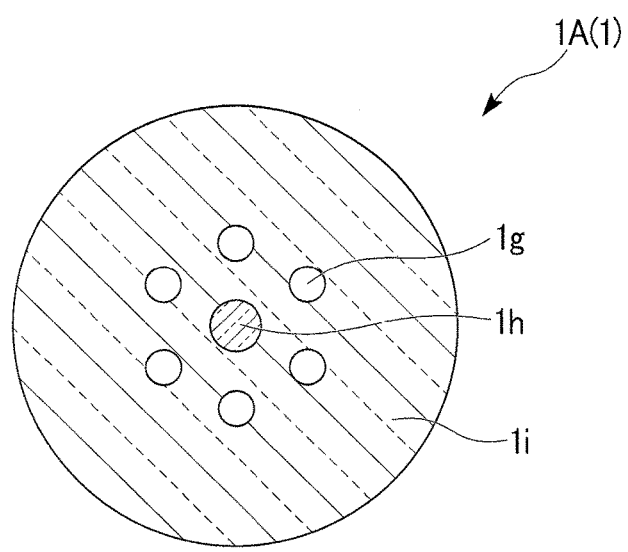
FIG. 8 is a cross-sectional view showing an example of a section (a section perpendicular to a longitudinal direction of a fiber) structure of a holes-including optical fiber which is used as a second optical fiber which is optically connected to a first optical fiber.

The solid refractive index matching material 321, which is within the region R1 shown in FIG. 7 and is within the region R2 in which Shore hardness E is 45 to 80, is suitably used when the insertion optical fiber 1 (specifically, the insertion side bare optical fiber 1a) is a holes-including optical fiber 1A (refer to FIG. 8).

FIG. 8 shows an example of a sectional structure perpendicular to a longitudinal direction (optical axis direction) of the holes-including optical fiber 1A. As shown in FIG. 8, the holes-including optical fiber 1A is an optical fiber having a plurality of holes 1g which are continuous in a waveguide direction. As the holes-including optical fiber (Holey Fiber, HF), there is a hole assist fiber (Hole-Assisted Fiber, HAF) or the like.

The holes-including optical fiber 1A shown in FIG. 8 includes a core portion 1h and a clad portion 1i surrounding the periphery of the core portion 1h, and the plurality of holes 1g are formed in the clad portion 1i. The plurality of holes 1g is uniformly disposed in the periphery of the core portion 1i.

When the insertion side bare optical fiber 1a is the holes-including optical fiber 1A, due to the tip of the holes-including optical fiber 1A being pressed to the solid refractive index matching material 321, the surface of the solid refractive index matching material 321 is formed in a shape having irregularities corresponding to the tip surface 1c of the insertion side bare optical fiber open to the holes 1g. That is, a portion of the solid refractive index matching material 321 enters the holes 1g open to the tip surface 1c of the insertion side bare optical fiber, and irregularities are formed on the surface of the solid refractive index matching material 321. As a result, the tip of the insertion side bare optical fiber 1a does not easily slide against the solid refractive index matching material 321, and the position (the position in the direction perpendicular to the optical axis of the rear end surface 32a of the built-in optical fiber), the orientation, and the alignment accuracy of the tip of the insertion side bare optical fiber 1a with respect to the rear end of the built-in optical fiber 32 are stabilized.

When the hardness of the solid refractive index matching material 321 is too low, even when a portion of the solid refractive index matching material 321 enters the holes 1g open to the tip surface 1c of the insertion side bare optical fiber, the position (the position in the direction perpendicular to the optical axis of the rear end surface 32a of the built-in optical fiber), the orientation, and the alignment accuracy of the tip of the insertion side bare optical fiber 1a with respect to the rear end of the built-in optical fiber 32 are not effectively stabilized.

Meanwhile, when the hardness of the solid refractive index matching material 321 is too high, a portion of the solid refractive index matching material 321 does not easily enter the holes 1g open to the tip surface 1c of the insertion side bare optical fiber, and as a result, the position (the position in the direction perpendicular to the optical axis of the rear end surface 32a of the built-in optical fiber), the orientation, and the alignment accuracy of the tip of the insertion side bare optical fiber 1a with respect to the rear end of the built-in optical fiber 32 are not effectively stabilized.

When the holes-including optical fiber 1A is used as the insertion side bare optical fiber 1a, the solid refractive index matching material 321 of the region R shown in FIG. 7 may be used, which causes no harm.

However, when the holes-including optical fiber 1A is used as the insertion side bare optical fiber 1a, from results of reviews of the inventors, it can be understood that by using the solid refractive index matching material 321 of the region R2 (Shore hardness E is 45 to 80) shown in FIG. 7, particularly good effects can be obtained with respect to stabilization of the position (the position in the direction perpendicular to the optical axis of the rear end surface 32a of the built-in optical fiber), the orientation, and the alignment accuracy of the tip of the insertion side bare optical fiber 1a with respect to the rear end of the built-in optical fiber 32.

In addition, as the rear end surface 32a of the built-in optical fiber, in addition to a flat surface perpendicular to the optical axis of the rear end of the built-in optical fiber 32 shown in FIGS. 5A to 5C, a surface subjected to Physical Contact (PC) grinding may be used. In addition, in the case of the rear end surface 32a of the built-in optical fiber subjected to PC grinding, use of the solid refractive index matching material 321 of the region R1 shown in FIG. 7 is suitable. In this case, when the holes-including optical fiber 1A is used as the insertion side bare optical fiber 1a, use of the solid refractive index matching material 321 of the region R2 (Shore hardness is 45 to 80) shown in FIG. 7 is suitable.

The base side element 35 of the clamp portion 33 of the clamp portion-attached ferrule 30 exemplified in FIGS. 1 to 4B is a plastic member or a metal member which is integrally formed with the flange portion 34. However, for example, the clamp portion-attached ferrule 30 may use a configuration in which the plastic base side element 35 is integrated with the metal flange portion 34 using insert molding forming, adhesion-fixing, fitting-fixing, or the like.

As shown in FIGS. 1 and 2, the spring 37 has an elongated shape which has an extension direction as a longitudinal direction. The spring 37 shown in FIGS. 1 and 2 includes a front spring portion 37b which is positioned at the front side (ferrule 31 side) of a slit 37a and a rear spring portion 37c which is positioned at the rear side of the slit 37a, which are separated by the slit 37a formed at a center portion in the longitudinal direction (extension direction).

As shown in FIG. 2, in the spring 37, a side opening portion 37d which extends over the entire length of the spring 37 in the longitudinal direction is formed. Two slits 37a are formed so as to extend along the circumferential direction of the spring 37 from both ends facing the side opening portion 37d of the spring 37 toward a portion (rear connection portion 37e) which is positioned on a side opposite to the side opening portion 37d via the element portion 331 positioned inside the spring 37. The front spring portion 37b and the rear spring portion 37c of the spring 37 are connected to each other via only the rear connection portion 37e which is secured between the two slits 37a, and function as springs independent from each other.

As shown in FIGS. 1 and 2, in the two elements (front element 361 and the rear element 362) configuring the cover side element 36, the entire rear element 362 is accommodated inside the rear spring portion 37c of the spring 37 and is collectively held with the rear end portion of the base side element 35 by elasticity of the rear spring portion 37c. Meanwhile, the front element 361 is accommodated inside the front spring portion 37b and the rear spring portion 37c of the spring 37, and is collectively held with the base side element 35 by elasticity of the spring 37.

As shown in FIGS. 1 and 2, hereinafter, a portion which is coated by a coating material of the insertion optical fiber 1 is referred to as a coating portion 1b.

As shown in FIGS. 1 and 3, a fiber-positioning groove 38, which includes the above-described aligning groove 38a and a coating portion-accommodating groove 38b which accommodates the coating portion 1b of the insertion optical fiber 1 and positions the coating portion 1b, is formed on the opposing surface 35f of the base side element 35. The aligning groove 38a is formed on a portion of the opposing surface 35f of the base side element 35 facing the front element 361. The coating portion-accommodating groove 38b is formed so as to extend rearward from the rear end of the aligning groove 38a.

The insertion optical fiber 1 is fed from the rear end opening portion of the housing 20 and can be inserted into the fiber-positioning groove 38. According to this feeding, the insertion side bare optical fiber 1a which has been led out from the insertion optical fiber 1 in advance can be inserted into the aligning groove 38a.

The aligning groove 38a is formed so as to extend along the extension direction (longitudinal direction) from the front end of the base side element 35 (the left end of the base side element 35 in FIG. 3) so as to be continuous to the fiber hole 31b penetrating the ferrule 31. The rear side extension portion 322 of the matching material-attached optical fiber 320 is accommodated in the aligning groove 38a. The rear end (solid refractive index matching material 321) of the matching material-attached optical fiber 320 is disposed at a center portion (in the shown example, a position which is slightly deviated toward the front side (ferrule 31 side) from the center in the longitudinal direction) in the longitudinal direction of the aligning groove 38a.

The coating portion-accommodating groove 38b is formed so as to extend from the rear end (an end portion opposite to the front end of the ferrule 31 side) of the aligning groove 38a to the rear end of the base side element 35 along the extension direction of the base side element 35.

Figure 4A:
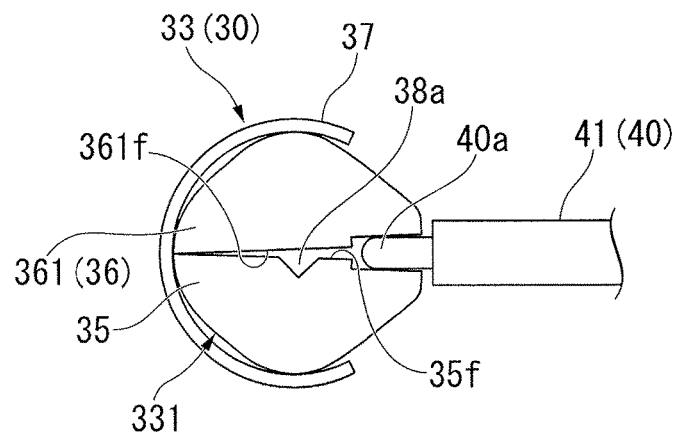
FIG. 4A is a view showing a state where an insertion member is interposed between elements in a section (a cross-section orthogonal to an extension direction of an aligning groove) structure of a clamp portion of the clamp portion-attached ferrule of FIG. 2.
Figure 4B:
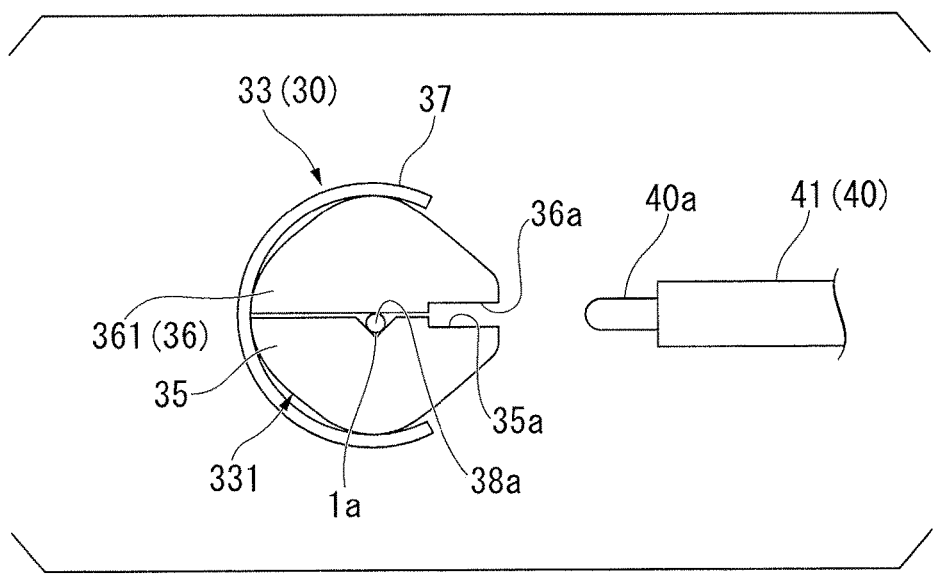
FIG. 4B is a view showing a state where the insertion member is pulled out from a portion between elements and an insertion optical fiber (more specifically, a bare optical fiber of the insertion optical fiber) is held and fixed between the elements in the section (the cross-section orthogonal to the extension direction of the aligning groove) structure of the clamp portion of the clamp portion-attached ferrule of FIG. 2.

As shown in FIGS. 4A and 4B, the aligning groove 38a of the shown example is formed as a V groove. However, the present invention is not limited to this, and the aligning groove 38a may be formed as a round groove (a semi-circular sectional groove), a U groove, or the like.

As shown in FIG. 3, a width and a depth of the coating portion-accommodating groove 38b are greater than those of the aligning groove 38a in order to accommodate and position the coating portion 1b which is thicker than the bare optical fiber 1a of the insertion optical fiber 1.

As shown in FIGS. 1 and 3, the clamp portion 33 of the optical connector 10 of the shown example has a configuration in which the coating portion-accommodating groove 38c is formed on an opposing surface 362f of the rear element 362. The coating portion-accommodating groove 38c formed on the opposing surface 362f of the rear element 362 is formed at a position corresponding to the coating portion-accommodating groove 38b of the base side element 35.

Front end portions of the coating portion-accommodating grooves 38b and 38c are formed in a taper shape, and the tip of the insertion optical fiber 1 (the tip of the insertion side bare optical fiber 1a) inserted into the fiber-positioning groove 38 from the rear side of the clamp portion 33 can be smoothly introduced into the aligning groove 38a.

In addition, as the clamp portion, a configuration in which the coating portion-accommodating groove is formed on one or both of the opposing surface of the base side element 35 and the opposing surface of the rear element 362 may be used. The coating portion-accommodating grooves 38b and 38c of the elements 35 and 352 of the clamp portion are formed so as to open to the rear end of the clamp portion 33. The coating portion-accommodating grooves 38b and 38c are formed in V grooves. However, the present invention is not limited to this, and the coating portion-accommodating grooves 38b and 38c may be formed as round grooves (semi-circular sectional grooves), U grooves, angled grooves, or the like.

As shown in FIG. 4A, a portion between the pair of elements 35 and 36 (base side element 35 and cover side element 36) of the clamp portion 33 of the optical connector 10 is slightly pushed and opened by a plate-shaped interposing member 40 which is interposed between the elements 35 and 36, and the led-out bare optical fiber 1a and the coating portion 1b of the insertion optical fiber 1 can be inserted (pushed) from the rear side of the clamp portion 33 into the fiber-positioning groove 38. Hereinafter, at this time, a state of the clamp portion 33 is referred to as an open state. In addition, the optical connector 10, in which the interposing member 40 is interposed between the pair of elements 35 and 36 of the clamp portion 33, is also referred to as an interposing member attached optical connector.

The interposing member 40 maintains the open state between the pair of elements 35 and 36 against elasticity of the spring 35 of the clamp portion 33.

As shown in FIG. 4A, the interposing member 40 is inserted so as to be interposed between the pair of elements 35 and 36 of the clamp portion 33 from the side opening portion 37d of the spring 37. In addition, the interposing member 40 is inserted into an interposing member insertion hole (not shown) penetrating the thick portion of the sleeve-shaped housing 20 (refer to FIG. 1) of the optical connector 10, and a tip portion 40a (refer to FIG. 4A) of the interposing member 40 is interposed between the pair of elements 35 and 36 of the clamp portion 33.

As shown in FIGS. 4A and 4B, since the interposing member 40 is inserted into a portion between the pair of elements 35 and 36 of the clamp portion 33 with an insertion depth which does not reach the fiber-positioning groove 38 of the element 35, the interposing member 40 does not interfere with work of inserting the insertion optical fiber 1 into the fiber-positioning groove 38.

As shown in FIG. 2, the interposing members 40 are inserted into each of a portion between the front element 361 and the base side element 35 and a portion between the rear element 362 and the base side element 35 according to two elements (front element 361 and the rear element 362) of the cover side element 36. That is, a total of two interposing members 40 are interposed between the pair of elements 35 and 36 of the clamp portion 33 at positions different from each other in the front-rear direction (the right-left direction in FIG. 1) of the clamp portion-attached ferrule 30 according to two elements 361 and 362 of the cover side element 36.

In FIG. 2, reference numeral 41 is assigned to the interposing member 40 which is interposed between the front element 361 and the base side element 35, and reference numeral 42 is assigned to the interposing member 4 which is interposed between the rear element 362 and the base side element 35.

As shown in FIG. 2, interposition recesses 35a and 36a, into which the tip portion 40a of the interposing member 40 is detachably inserted, are formed on the elements 35 and 36 of the clamp portion 33 of the clamp portion-attached ferrule. The interposition recesses 35a and 36a are formed so as to be recessed from the opposing surfaces of the elements 35 and 36 at mutually corresponding positions of the opposing surface 361f of the front element 361 and the opposing surface 35f of the base side element 35, and mutually corresponding positions of the opposing surface 362f of the rear element 362 and the opposing surface 35f of the base side element 35. The pairs of interposition recesses 35a and 36a which are formed at mutually corresponding positions of the opposing surfaces of the elements 35 and 36 are formed on the element portion 331 of the clamp portion 33 of the clamp portion-attached ferrule 30 at two locations in the front-rear direction of the clamp portion-attached ferrule 30.

As shown in FIGS. 4A and 4B, each of the interposition recesses 35a and 36a is formed so as to extend from the side surfaces of the elements 35 and 36 facing the side opening portion 37d of the spring 37 toward the fiber-positioning groove 38, and is open to the side surfaces of the elements 35 and 36 facing the side opening portion 37d of the spring 37. In each of the interposition recesses 35a and 36a, an extension dimension from each of the side surfaces of the elements 35 and 36 facing the side opening portion 37d of the spring 37 is set so that the interposition recesses 35a and 36 do not reach the fiber-positioning groove 38.

Each of the two interposing members 41 and 42 is detachably inserted into a portion between the pair of the interposition recesses 35a and 36a at mutually corresponding positions of the opposing surfaces of the elements 35 and 36.

The interposing member 40 includes a portion protruding outside the housing 20 (refer to FIG. 1) on a base end side opposite to the tip portion 40a, and this portion can function as a pull-out operation portion for extracting the interposing member 40 from the optical connector 10.

A portion between the elements 35 and 36 of the clamp portion 33 can be opened and closed by insertion and detachment of the interposing member 40 with respect to a portion between the elements 35 and 36 (specifically, insertion and detachment of the interposing member 40 with respect to a portion between the pair of the interposition recesses 35a and 36a).

The interposing member 40 may have any configuration as long as it can maintain an open state between the pair of elements 35 and 36 against elasticity of the spring 35 of the clamp portion 33 and can be operated so as to be pulled out from the portion between the pair of elements 35 and 36, and the shape of the interposing member 40 is not limited to the plate shape. For example, the interposing member 40 may be formed in a soft sheet shape or a rod shape.

The optical connector 10 is a field assembly optical connector.

In order to attach (assemble) the optical connector 10 to the tip portion of the insertion optical fiber 1, as shown in FIGS. 2 and 4A, the clamp portion 33 is brought into an open state (that is, a state of the interposing member attached optical connector) by the interposing member 40 interposed between the elements 35 and 36. In addition, the insertion optical fiber 1 having the led-out bare optical fiber 1a is fed into the fiber-positioning groove 38 of the element portion 331 of the clamp portion 33 from the rear end opening portion of the housing 20, and the insertion side bare optical fiber 1a is inserted into the aligning groove 38a.

Due to the insertion side bare optical fiber 1a being inserted into the aligning groove 38a, the tip of the fiber 1a is inserted into the liquid refractive index matching agent 323.

When the insertion optical fiber 1 is butt-connected to the rear end of the matching material-attached optical fiber 320, the tip of the insertion side bare optical fiber 1a is pressed to the solid refractive index matching material 321 of the rear end of the matching material-attached optical fiber 320 by the insertion optical fiber 1 being pushed in from the rear end of the clamp portion 33. In addition, in a state where a state where the tip of the insertion side bare optical fiber 1a butts against the solid refractive index matching material 321 due to the pushing-in force of the insertion optical fiber 1 from the rear end of the clamp portion 33 being maintained, all interposing members 40 interposed between the elements 35 and 36 of the clamp portion 33 are removed (refer to FIG. 4B).

Accordingly, the portion inserted into the fiber-positioning groove 38 of the insertion optical fiber 1 and the rear side extension portion 322 of the matching material-attached optical fiber 320 are optically connected to each other, and an optical fiber connection structure is obtained, in which the portion inserted into the fiber-positioning groove 38 and the rear side extension portion 322 are held and fixed between the elements 35 and 36 of the clamp portion 33 by elasticity of the spring 35 of the clamp portion 33. In addition, as a result, since extraction of the insertion optical fiber 1 from the clamp portion 33 is restricted, it is possible to attach (assemble) the optical connector 10 to the tip portion of the insertion optical fiber 1.

In the clamp portion 33, hereinafter, the state where the portion of the insertion optical fiber 1 inserted into the fiber-positioning groove 38 and the rear side extension portion 322 of the matching material-attached optical fiber 320 are held and fixed between the pair of elements 35 and 36 is referred to as a fiber-holding state.

After a coating of the tip portion of the insertion optical fiber 1 is removed (the bare optical fiber 1a is led out) and cutting is performed on site, the insertion optical fiber 1 is inserted into the fiber-positioning groove 38.

A lead-out length L (refer to FIG. 1) of the bare optical fiber 1a of the insertion optical fiber 1 is set so that the bare optical fiber 1a is accommodated in the aligning groove 38a of the fiber-positioning groove 38 and the coating portion 1b is accommodated in the coating portion-accommodating grooves 38b and 38c of the fiber-positioning groove 38 when the insertion optical fiber 1 is fed into the fiber-positioning groove 38 by a length reaching a desired position at which the tip of the bare optical fiber 1a is optically connected to the built-in optical fiber 32. Accordingly, when the interposing member 40 is pulled out from the clamp portion 33 and the clamp portion 33 enters the fiber-holding state after the tip of the insertion side bare optical fiber 1a reaches a desired position with respect to the built-in optical fiber 32, the insertion side bare optical fiber 1a is held and fixed between front element 361 and the base side element 35 along with the rear side extension portion 322 of the matching material-attached optical fiber 320, and the insertion optical fiber coating portion 1b is held and fixed between the rear element 362 and the base side element 35.

A portion facing the aligning groove 38a of the opposing surface of the cover side element 36 (here, the opposing surface 361f of the front element 361, refer to FIG. 3) facing the opposing surface 351 of the base side element 35 is a flat surface having high flatness. When the interposing member 40 is removed from the clamp portion 33 in an open state, the insertion side bare optical fiber 1a and the rear side extension portion 322 of the matching material-attached optical fiber 320 are pressed to the aligning groove 38a by elasticity of the spring 35 of the clamp portion 33, and are accurately positioned (aligned) by the aligning groove 38a. As a result, in the state where the insertion side bare optical fiber 1a and the rear side extension portion 322 of the matching material-attached optical fiber 320 are optically connected to each other, the insertion side bare optical fiber 1a and the rear side extension portion 322 of the matching material-attached optical fiber 320 are held and fixed between the front element 361 and the base side element 35.

The insertion optical fiber 1 uses an optical fiber in which an outer diameter of the bare optical fiber 1a is the same as an outer diameter of the built-in optical fiber 32.

In addition, for example, when a chamfered portion is formed between the rear end surface 32a of the built-in optical fiber 32 and the side surface (circumferential surface) of the built-in optical fiber 32, the solid refractive index matching material 321 of the matching material-attached optical fiber 320 may be also provided on the chamfered portion in addition to the rear end surface 32a of the built-in optical fiber. However, the solid refractive index matching material 321 is not provided on the side surface of the built-in optical fiber 32. In addition, an installation range of the solid refractive index matching material 321 provided on the rear side of the side surface of the built-in optical fiber 32 is limited to within a range of a virtual extension of the side surface of the built-in optical fiber 32.

As shown in FIG. 5B, the tip surface 1c of the insertion side bare optical fiber 1a may not be flat, and irregularities may exist on the tip surface 1c.

FIG. 5B shows the state where the tip of the insertion side bare optical fiber 1a having irregularities on the tip surface 1c abuts on the solid refractive index matching material 321 in the liquid refractive index matching agent 323.

In FIG. 5B, even when irregularities exist on the tip surface 1c of the insertion side bare optical fiber 1a, a portion between the built-in optical fiber 32 and the core portions 32c and 1e (or mode field diameter portion) of the insertion side bare optical fiber 1a is embedded with the soft solid refractive index matching material 321 which functions as a cushion layer. Accordingly, it is possible to realize an optical connection having low loss.

In addition, when the solid index matching material 321 does not bury a concave portion existing on the core portion 1e (or mode field diameter portion) of the tip surface 1c of the insertion side bare optical fiber 1a and a location separated from an inner surface of a concave portion on the outer surface of the solid refractive index matching material 321 exists, a portion between the inner surface of the concave portion and the outer surface of the solid refractive index matching material 321 separated from the inner surface of the concave portion is embedded with the liquid refractive index matching agent 323. Accordingly, it is possible to realize an optical connection having low loss.

In general, in cutting of the bare optical fiber, after an initial scratch for cleavage is formed on the surface of the bare optical fiber, the bare optical fiber is cleft from the initial scratch.

When a cut surface (cleavage surface) on which irregularities exist on the bare optical fiber is formed, a convex portion 1d having a great protrusion dimension from a virtual plane perpendicular to the optical axis of the optical fiber in the cut surface is likely to be formed on an outer circumferential portion of the cut surface.

In addition, the protrusion dimension of the bare optical fiber from the virtual plane perpendicular to the fiber optical axis on the cut surface of the bare optical fiber is approximately 20 μm at a maximum.

In the insertion side bare optical fiber 1a shown in FIG. 5B, among a plurality of convex portions on the tip surface 1c, the convex portion 1d having the maximum protrusion dimension from the virtual plane perpendicular to the optical axis of the bare optical fiber 1a on tip surface 1c is formed on the outer circumferential portion of the tip surface 1c (cut surface).

As shown in FIG. 5B, the solid refractive index matching material 321 having a partially spherical shape provided on the rear end surface 32a of the built-in optical fiber comes into contact with a center portion region including the core portion 1e (or mode field diameter portion) on the tip surface 1c of the insertion side bare optical fiber 1a by slightly elastic deformation. However, the solid refractive index matching material 321 having a partially spherical shape does not come into contact with the outer circumferential portion of the tip surface 1c of the insertion side bare optical fiber 1a. Accordingly, a contact between the solid refractive index matching material 321 having a partially spherical shape and the convex portion 1d of the outer circumferential portion of the tip of the insertion side bare optical fiber 1a is avoided, or the solid refractive index matching material 321 having a partially spherical shape presses only the portion which is positioned on the center portion of the tip surface 1c of the insertion side bare optical fiber 1a in the convex portion 1d. In the solid refractive index matching material 321 having a partially spherical shape, embedding with respect to the entire convex portion 1d on the outer circumferential portion of the tip of the insertion side bare optical fiber 1a shown in FIG. 5B can be avoided.

For example, compared to a layered solid refractive index matching material which covers the entire rear end surface 32a of the built-in optical fiber with a uniform thickness, the solid refractive index matching material 321 having a partially spherical shape is advantageous in that the solid refractive index matching material 321 comes into contact with the center portion region including the core portion 1e (or mode field diameter portion) on the tip surface 1c of the insertion side bare optical fiber 1a and comes into close contact with the core portion 1e.

In addition, as described above, since the thickness of the portion of the solid refractive index matching material 321 having a partially spherical shape covering the core portion 32c (or mode field thickness) of the rear end surface 32a of the built-in optical fiber is 20 μm to 50 μm (20 μm or more and 50 μm or less), there is no possibility of the convex portion 1d on the outer circumferential portion of the tip surface 1c of the insertion side bare optical fiber 1a abutting on the built-in optical fiber 32.

In order to more reliably avoid the convex portion 1d on the outer circumferential portion of the tip surface 1c of the insertion side bare optical fiber 1a abutting on the built-in optical fiber 32, preferably, the thickness of the portion of the solid refractive index matching material 321 having a partially spherical shape covering the core portion 32c (or mode field diameter) of the rear end surface 32a of the built-in optical fiber is 30 μm or more.

If the convex portion 1d of the tip of the insertion optical fiber 1 abuts on the rear end of the built-in optical fiber 32 and cracks are generated in at least one of the insertion optical fiber 1 and the built-in optical fiber 32, since the contact position of the convex portion 1d of the tip of the insertion optical fiber 1 with respect to the rear end of the built-in optical fiber 32 is positioned at a location deviated from a joining boundary surface between the solid refractive index matching material 321 and the tip of the insertion side bare optical fiber 1a, disadvantages such as fragments generated by cracks being inserted into the portion between the solid refractive index matching material 321 and the tip of the insertion side bare optical fiber 1 do not easily occur.

As described above, even when the tip of the optical fiber 1a is disposed at the position which is separated rearward from the solid refractive index matching material 321 in the liquid refractive index matching agent 323 (refer to FIG. 5C), the insertion side bare optical fiber 1a can be optically connected to the built-in optical fiber 32.

As shown in FIG. 5B, in assembly of the optical connector 10 in which the tip of the insertion side bare optical fiber 1a is butt-connected to the rear end (solid refractive index matching material 321) of the matching material-attached optical fiber 320 in the liquid refractive index matching agent 323, as described above, the open state of the clamp portion 33 is changed to the fiber-holding state by the pulling out of the interposing member 40 while the abutment state of the tip of the insertion side bare optical fiber 1a with respect to the solid refractive index matching material 321 is maintained by the pushing-in force of the insertion optical fiber 1 from the rear side of the clamp portion 33. In the optical connector 10 of the present embodiment, during work, even when the tip of the insertion side bare optical fiber 1a is separated rearward from the solid refractive index matching material 321 (state of FIG. 5C) due to unexpected tension of the insertion optical fiber 1 or the like, the portion between the tip of the insertion side bare optical fiber 1a and the solid refractive index matching material 321 is embedded with the liquid refractive index matching agent 323. Accordingly, an optical connection between the insertion optical fiber 1 (specifically, the insertion side bare optical fiber 1a) and the matching material-attached optical fiber 320 can be secured via the liquid refractive index matching agent 323 between the tip of the insertion side bare optical fiber 1a and the solid refractive index matching material 321.

In the optical connector 10, during work of assembling the insertion optical fiber 1, even when the tip of the insertion side bare optical fiber 1a is separated rearward from the solid refractive index matching material 321, it is not necessary to perform the work again.

The optical connection between the insertion optical fiber 1 (specifically, the insertion side bare optical fiber 1a) and the matching material-attached optical fiber 320 is secured by the optical connector 10 and the clamp portion-attached ferrule 30 and it is possible to effectively perform the assembly work with respect to the tip portion of the insertion optical fiber 1.

In addition, in the optical connector 10 and the clamp portion-attached ferrule 30, after the butt-connection of the insertion optical fiber 1 (specifically, the insertion side bare optical fiber 1a) with respect to the matching material-attached optical fiber 320, and holding and fixing of the optical fibers 1 and 320 using the clamp portion 33 are completed, even when the tip of the insertion side bare optical fiber 1a is separated rearward from the solid refractive index matching material 321 due to any cause (for example, unexpected tension of the insertion optical fiber 1, or the like), the optical connection state between the insertion optical fiber 1 and the matching material-attached optical fiber 320 can be maintained.

In the optical connector 10 and the clamp portion-attached ferrule 30, the optical connection state between the insertion optical fiber 1 and the matching material-attached optical fiber 320 can be stably maintained over a long period of time, and long-period reliability can be improved.

As shown in FIGS. 5A to 5C, when the solid refractive index matching material 321 having a partially spherical shape of the rear end of the matching material-attached optical fiber 320 approaches the tip of the insertion side bare optical fiber 1a due to feeding (advancement) of the insertion optical fiber 1 into the fiber-positioning groove 38, it is possible to smoothly move the liquid refractive index matching agent 323 from the portion between the tip of the insertion side bare optical fiber 1a and the solid refractive index matching material 321 according to the approaching of the tip of the insertion side bare optical fiber 1a.

According to the approaching of the tip of the insertion side bare optical fiber 1a with respect to the solid refractive index matching material 321, the liquid refractive index matching agent 323 is moved so as to be extruded from the portion between the tip of the insertion side bare optical fiber 1a and the solid refractive index matching material 321 by the tip of the insertion side bare optical fiber 1a. The liquid refractive index matching agent 323 positioned in the vicinity of the apex of the solid refractive index matching material 321 can smoothly move to a location separated from the vicinity of the apex of the solid refractive index matching material 321 along the outer surface of the solid refractive index matching material 321 having a partially spherical shape. This continues immediately before the tip of the insertion side bare optical fiber 1a comes into contact with the solid refractive index matching material 321.

Accordingly, in the configuration in which the solid refractive index matching material 321 having a partially spherical shape is used on the rear end of the matching material-attached optical fiber 320, for example, immediately before the tip of the insertion side bare optical fiber 1a comes into contact with the solid refractive index matching material 321, foreign substances or bubbles existing in the liquid refractive index matching agent 323 in the vicinity of the apex of the solid refractive index matching material 321 can be removed from the portion between the vicinity of the apex of the solid refractive index matching material 321 and the tip of the insertion side bare optical fiber 1*a* along with the liquid refractive index matching agent 323 by movement of the liquid refractive index matching agent 323 according to advancement of the tip of the insertion side bare optical fiber 1*a*.

In addition, after the apex of the solid refractive index matching material 321 comes into contact with the core portion 1*e* (or mode field diameter portion) of the tip surface 1*c* of the insertion side bare optical fiber 1*a*, the contact range of the solid refractive index matching material 321 with respect to the tip surface 1*c* of the insertion side bare optical fiber 1*a* is widened while the solid refractive index matching material 321 is elastically deformed according to the advancement of the insertion side bare optical fiber 1*a*. As a result, the configuration, in which the solid refractive index matching material 321 having a partially spherical shape is used on the rear end of the matching material-attached optical fiber 320, effectively contributes to prevention or suppression with respect to foreign substances or bubbles entering between the solid refractive index matching material 321 and the tip of the insertion side bare optical fiber 1*a* coming into contact with the solid refractive index matching material 321.

(Another Embodiment)

Figure 6A:
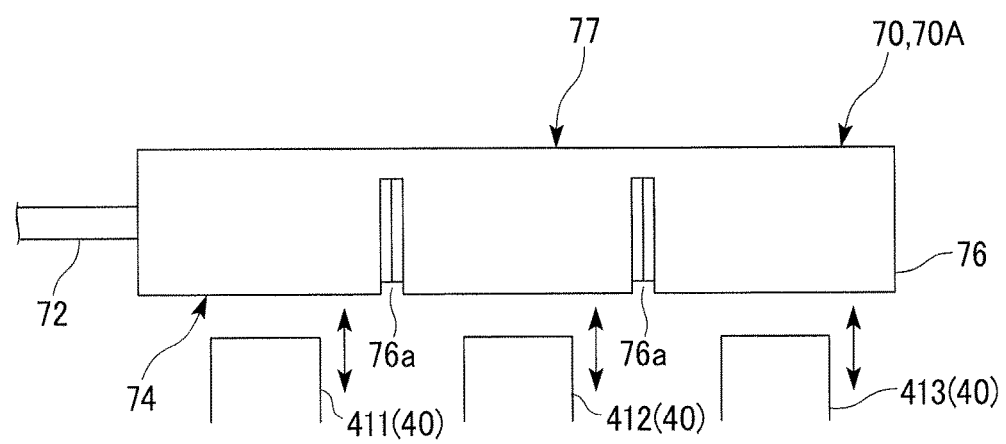
FIG. 6A is a plan view showing an optical fiber connector of another embodiment of the present invention.
Figure 6B:
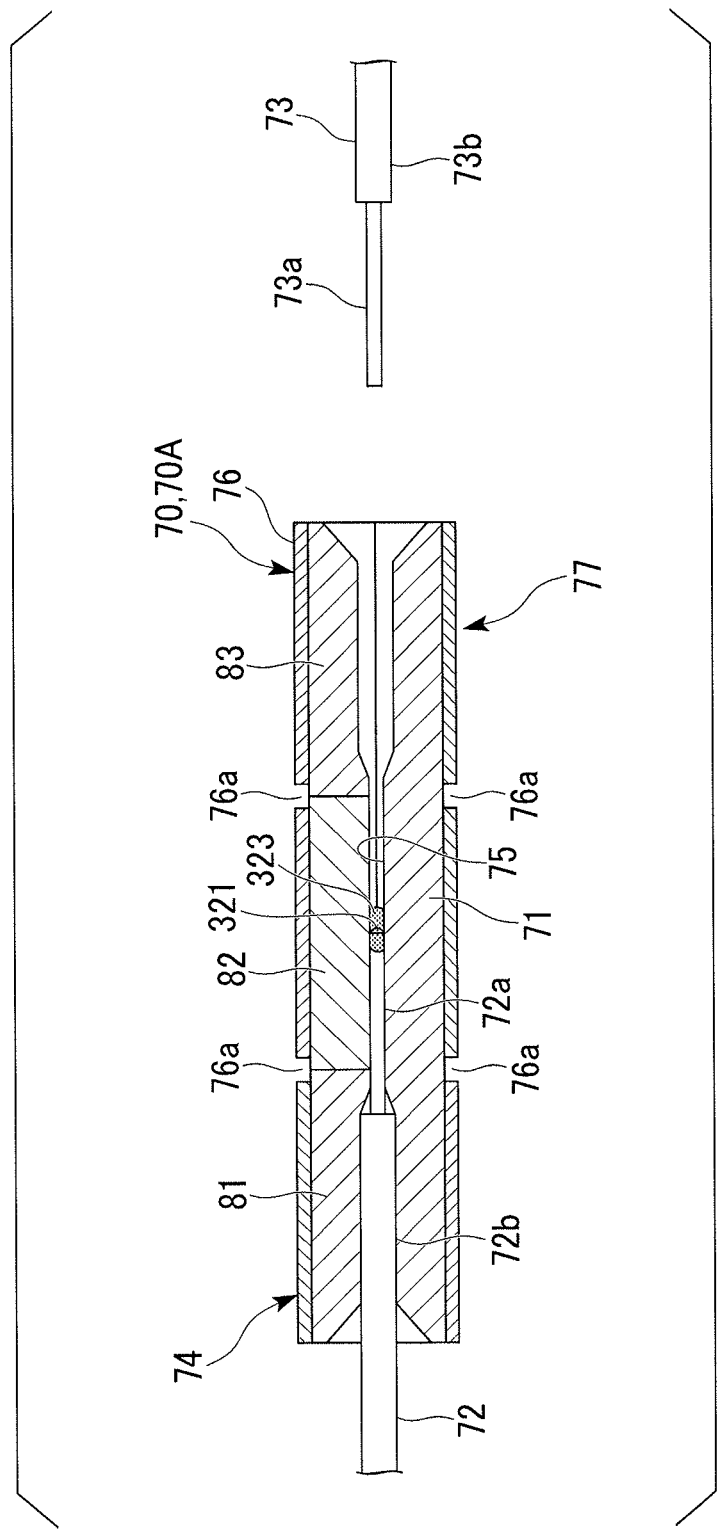
FIG. 6B is a side sectional view showing the optical fiber connector of another embodiment of the present invention.

FIGS. 6A and 6B show an optical fiber connector 70 according to another embodiment of the present invention.

As shown in FIGS. 6A and 6B, the optical fiber connector 70 is a so-called mechanical splice.

In the optical fiber connector 70, an elongated base side element 71 (base member), and three cover side members 81, 82, and 83 (cover members) which are installed so as to be arranged in one row along a longitudinal direction of the base side element 71 are accommodated and held inside a spring 76 which is formed by processing a metal sheet and extends in a C sectional shape. The spring 76 functions as a biasing member which elastically biases the cover side elements 81, 82, and 83 toward the base side element 35.

Each of the three cover side elements 81, 82, and 83 shown in FIG. 6B functions as a pressing member which presses the optical fibers (matching material-attached optical fiber 720 and second optical fiber 73 described below) disposed between the cover side elements and the base side element 71 to the base side element 71 by elasticity of the spring 76.

Hereinafter, the cover side elements 81, 82, and 83 are also referred to as pressing elements.

As shown in FIG. 6B, for example, the optical fibers 720 and 73 in which the tips are butted to each other are held and fixed between the pressing elements 81, 82, and 83 and the base side element 71 by the optical fiber connector 70, and it is possible to maintain an optical connection state between the optical fibers 720 and 73. The tips of the optical fibers 720 and 73 are disposed so as to be optically connected to each other between the second pressing element 82 positioned at the center of the arrangement among the three pressing elements 81, 82, and 83 and the base side element 71, and the optical fibers 720 and 73 are optically connected to each other.

FIGS. 6A and 6B show a state where the tip of the optical fiber 72 (hereinafter, also referred to as a first optical fiber) is held and fixed between the first pressing element 81 positioned at one end of the arrangement among the three pressing elements 81, 82, and 83 and the base side element 71. The first pressing element 81 holds and fixes the first optical fiber 72 between the first pressing element 81 and the base side element 71 by elasticity of the spring 76.

The solid refractive index matching material 321 is provided on the tip of the first optical fiber 72 which is disposed between the first pressing element 81 and the base side element 71. The solid refractive index matching material 321 shown in FIG. 6B is formed in a partially spherical shape.

Hereinafter, an optical fiber in which the solid refractive index matching material 321 is provided on the tip of the optical fiber (first optical fiber 72) is also referred to as the matching material-attached optical fiber 720.

In FIG. 6B, the solid refractive index matching material 321 of the tip of the matching material-attached optical fiber 720 is disposed between the second pressing element 82 positioned at the center in the arrangement among the three pressing elements 81, 82, and 83 and the base side element 71. In addition, the entire solid refractive index matching material 321 of the tip of the matching material-attached optical fiber 720 is embedded in the liquid refractive index matching agent 323 which is provided to be attached to the side of the base side element 71 facing the second pressing element 82. The liquid refractive index matching agent 323 is provided so as to rise toward a portion of the base side element 71 facing the second pressing element 82.

The three pressing elements 81 to 83 can be individually opened and closed with respect to the base side element 71 by insertion and detachment of the interposing member 40 into and from portions between the three pressing elements 81 to 83 and the base side element 71.

In FIG. 6A, reference numeral 411 is assigned to the interposing member 40 which is interposed between the first pressing element 81 and the base side element 71, reference numeral 412 is assigned to the interposing member 40 which is interposed between the second pressing element 82 and the base side element 71, and reference numeral 413 is assigned to the interposing member 40 which is interposed between the third pressing element 83 and the base side element 71.

The matching material-attached optical fiber 720 can be inserted into and detached from the portions between the first and second pressing elements 81 and 82 and the base side element 71 in a state where the first and second pressing elements 81 and 82 are opened with respect to the base side element 71 using the interposing members 41 and 42.

The tip portion of the second optical fiber 73 (another optical fiber, and hereinafter, also referred to as an insertion optical fiber) which is optically connected to the matching material-attached optical fiber 720 is disposed between the second and third pressing elements 82 and 83 and the base side element 71. The second optical fiber 73 can be inserted into and detached from the portions between the second and third pressing elements 82 and 83 and the base side element 71 in a state where the second and third pressing elements 82 and 83 are opened with respect to the base side element 71 using the interposing members 42 and 43.

In FIGS. 6A and 6B, specifically, the first optical fiber 72 and the second optical fiber 73 are coated optical fibers which are referred to as a single-core optical fiber core wire or a single-core optical fiber wire.

In a state where coating materials of tip portions of the first optical fiber 72 and the second optical fiber 73 are removed and bare optical fibers 72*a* and 73*a* are led out, the first optical fiber 72 and the second optical fiber 73 are inserted into portions between the base side element 71 and the pressing elements 8 to 83.

The bare optical fibers 72*a* and 73*a* led out from the tip portions of the first optical fiber 72 and the second optical fiber 73 are disposed between the second pressing element 82 and the base side element 71 of the optical fiber connector 70. A coating portion 72b which is a portion in which the bare optical fiber 72a of the first optical fiber 72 is covered by a coating material is disposed between the first pressing element 81 and the base side element 71 of the optical fiber connector 70. A coating portion 73b which is a portion in which the bare optical fiber 73a of the second optical fiber 73 is covered by a coating material is disposed between the third pressing element 81 and the base side element 71 of the optical fiber connector 70.

In addition, specifically, the solid refractive index matching material 321 of the matching material-attached optical fiber 720 is provided on the tip surface of the bare optical fiber 72a which is led out from the tip portion of the first optical fiber 72.

The solid refractive index matching material 321 having a partially spherical shape is provided on the tip of the bare optical fiber 72a so that an apex at which a protrusion dimension from the tip surface of the bare optical fiber 72a is the maximum value is positioned on an optical axis on the tip surface of the bare optical fiber 72a.

As shown in FIGS. 6A and 6B, the optical fiber connector 70 extends with the longitudinal direction of the base side element 71 as a longitudinal direction of the optical fiber connector 70, and the entire optical fiber connector 70 is formed in an elongated shape.

As shown in FIG. 6B, an aligning groove 75 is formed on a surface of the base side element 71 facing the second pressing element 82 so as to extend in a longitudinal direction of a connector.

The bare optical fiber 72a and the solid refractive index matching material 321 of the tip portion of the matching material-attached optical fiber 720 are accommodated in the aligning groove 75. The bare optical fiber 73a which is led out from the insertion optical fiber 73 is accommodated in the aligning groove 75, and the tip of the bare optical fiber 73a abuts on the tip (solid refractive index matching material 321) of the matching material-attached optical fiber 72. The aligning groove 75 can position and align the bare optical fiber 73a of the insertion optical fiber 73 and the tip of the matching material-attached optical fiber 720 so that the bare optical fiber 73a can be butt-connected to the tip of the matching material-attached optical fiber 720.

As a method (a method of assembling optical fiber connection portions) of optically connecting the second optical fiber 73 to the matching material-attached optical fiber 720 using the optical fiber connector 70, the following three methods (first to third methods) may be exemplified.

In the first method, the optical fiber connector 70 (a pigtail-attached connector 70A) is used in which the tip portion of the matching material-attached optical fiber 720 is inserted between the first and second pressing elements 81 and 82 and the base side element 71 is held and fixed between the first pressing element 81 and the base side element 71. In addition, as shown in FIG. 6B, the pigtail-attached connector 70A has a configuration in which the entire solid refractive index matching material 321 of the tip of the matching material-attached optical fiber 720 is embedded in the liquid refractive index matching agent 323 provided on the base side element 71. The pigtail-attached connector 70A includes the matching material-attached optical fiber 720 and the liquid refractive index matching agent 323.

In the first method (the method of assembling the optical fiber connection portions), the second optical fiber 73 is inserted between the base side element 71 of the pigtail-attached connector 70A and the second and third pressing elements 82 and 83 opened with respect to the base side element 71 using the interposing members 42 and 43, and the tip of the second optical fiber 73 abuts on the tip (solid refractive index matching material 321) of the matching material-attached optical fiber 720. The tip of the second optical fiber 73 abuts on the solid refractive index matching material 321 of the tip of the matching material-attached optical fiber 72 in the liquid refractive index matching agent 323. Sequentially, in the state where the abutment is maintained, the interposing member 40 is removed from the portions between the second pressing element 82 and the third pressing element 83, and the base side element 71.

Accordingly, the bare optical fiber 72a of the tip portion of the matching material-attached optical fiber 720, the solid refractive index matching material 321, and the bare optical fiber 73a of the tip portion of the insertion optical fiber 73 can be held and fixed between the second pressing element 82 and the third pressing element 83, and the base side element 71. As a result, in the optical fiber connector 70, an optical fiber connection structure in which an optical connection state between the matching material-attached optical fiber 720 and the insertion optical fiber 73 is maintained can be realized.

The insertion optical fiber 73 is optically connected to the first optical fiber 72 via the solid refractive index matching material 321 of the tip of the matching material-attached optical fiber 72.

In the first method, holding and fixing of the first optical fiber 72 is maintained by the first pressing element 81 and the base side element 71 of the pigtail-attached connector 70A.

As shown in FIGS. 6A and 6B, the spring 76 of the optical fiber connector 70 is formed in an elongated shape which extends with the longitudinal direction of the connector as a longitudinal direction of the spring 76. The spring 76 is divided into three regions (individual spring regions), which function as springs elastically biasing each cover side element (pressing element) toward the base side element 71, by slits 76a which are formed at two locations in the longitudinal direction. The slit 76a is formed so as to extend in the circumferential direction of the spring 76 from each of both ends of the slit 76a facing an opening portion in a C shaped cross-section perpendicular to the longitudinal direction of the spring 76. The three individual spring regions of the spring 76 are secured so as to correspond to the three cover side elements 81, 82, and 83. Each of the three cover side elements 81, 82, and 83 can be independently opened and closed with respect to the base side element 71.

Accordingly, the first pressing element 81 of the pigtail-attached connector 70A can stably maintain the state where the first optical fiber 72 is held and fixed between the first pressing element 81 and the base side element 71 without being affected by opening and closing of the second and third pressing elements 82 and 83 with respect to the base side element 71.

The portion from the second pressing element 82 to the first pressing element 81 side in the longitudinal direction of the connector (longitudinal direction of the optical fiber connector 70) of the pigtail-attached connector 70A functions as a fiber-fixing portion 74 which holds and fixes the matching material-attached optical fiber 720 (specifically, the first optical fiber 72). Specifically, the fiber-fixing portion 74 of the pigtail-attached connector 70A shown in FIGS. 6A and 6B holds and fixes the coating portion 72b of the first optical fiber 72.

The portion held by the fiber-fixing portion 74 of the matching material-attached optical fiber 720 is fixed to the base side element 71.

In addition, the portion from the fiber-fixing portion 74 of the optical fiber connector 70 to the second pressing element 82 side in the longitudinal direction of the connector functions as a clamp portion 77 which can hold and fix the tip portion of insertion optical fiber 73 along with the bare optical fiber 72a of the tip portion of the matching material-attached optical fiber 720 and the solid refractive index matching material 321.

In the second method, the optical fiber connector 70 uses a connector (hereinafter, also referred to as a liquid-matching agent-attached connector) having a configuration to which only the liquid refractive index matching agent 323 out of the matching material-attached optical fiber 720 and the liquid refractive index matching agent 323 (refer to FIG. 6B) is added.

The liquid-matching agent-attached connector has a configuration in which only the matching material-attached optical fiber 720 is omitted from the above-described pigtail-attached connector 70A.

For example, in the second method, in a state where portions between the cover side elements 81, 82, and 83 of the liquid-matching agent-attached connector and the base side element 71 are opened by interposition of the interposing members 411, 412, and 413, the optical fibers 720 and 73 are inserted from both sides in the longitudinal direction of the connector between the cover side elements 81, 82, and 83 and the base side element 71. In addition, the tip of the second optical fiber 73 abuts on the tip of the matching material-attached optical fiber 720 in the liquid refractive index matching agent 323. Sequentially, the interposing members 411, 412, and 413 are pulled out from the optical fiber connector 70, and the optical fibers 720 and 73 are held and fixed between the cover side elements 81, 82, and 83 and the base side element 71.

In addition, in the second method, a procedure of inserting, holding, and fixing the optical fibers 720 and 73 to the portions between the cover side elements 81, 82, and 83 and the base side element 71 is not limited to the above-described procedure.

In the optical fibers 720 and 73, for example, first, after the insertion, holding, and fixing of the second optical fiber 73 to the portions between the cover side elements 81, 82, and 83, and the base side element 71 are completed, insertion, holding, and fixing of the matching material-attached optical fiber 720 to the portions between the cover side elements 81, 82, and 83 and the base side element 71 may be performed.

In the third method, the optical fiber connector 70 in which the matching material-attached optical fiber 720 and the liquid refractive index matching agent 323 (refer to FIG. 6B) are not provided is used.

In the third method, first, in a state where portions between the cover side elements 81, 82, and 83 and the base side element 71 of the optical fiber connector 70 are opened by interposition of the interposing members 411, 412, and 413, the optical fibers 720 and 73 are inserted from both sides in the longitudinal direction of the connector between the cover side elements 81, 82, and 83 and the base side element 71, and the optical fibers 720 and 73 abut each other. Sequentially, the liquid refractive index matching agent 323 (refer to FIG. 6B) fills a location at which the optical fibers 720 and 73 abut each other, and the entire solid refractive index matching material 321 of the tip of the matching material-attached optical fiber 72 and the tip of the second optical fiber 73 (the tip of the bare optical fiber 73a) are embedded in the liquid refractive index matching agent 323.

Sequentially, the interposing members 411, 412, and 413 are pulled out from the optical fiber connector 70, and the optical fibers 720 and 73 are held and fixed between the cover side elements 81, 82, and 83 and the base side element 71.

In the first to third methods, even when the tip of the second optical fiber 73 is disposed so as to be separated from the tip of the matching material-attached optical fiber 72 in the liquid refractive index matching agent 323, the second optical fiber 73 and the first optical fiber 72 can be optically connected to each other via the liquid refractive index matching agent 323 and the solid refractive index matching material 321.

Preferably, a distance between the tip of the insertion optical fiber 73 (the tip of the bare optical fiber 73a) and the tip of the first optical fiber 72 (the tip of bare optical fiber 72) is similar to the distance L1 (refer to FIG. 5C) between fiber end surfaces in the above-described optical connector 10.

In addition, preferably, a distance between the tip of the insertion optical fiber 73 (the tip of the bare optical fiber 73a) and the solid refractive index matching material 321 is similar to the distance L2 (refer to FIG. 5C) between the matching material and the fiber in the above-described optical connector 10.

Preferably, a distance (the thickness of the solid refractive index matching material 321) between the solid refractive index matching material 321 and the tip of the first optical fiber 72 (the tip of the bare optical fiber 72a) is similar to the thickness D of the solid refractive index matching material 321 in the above-described optical connector 10.

In addition, the present invention is not limited to the above-described embodiments, and can be appropriately modified within a scope which does not depart from the gist.

In FIGS. 3 and 5A to 5C, as the built-in optical fiber 32, the optical fiber is used in which the rear end surface 32a (the tip surface of the rear side extension portion 322, and hereinafter, also referred to as a perpendicular rear end surface) perpendicular to the optical axis is formed on the rear end of the built-in optical fiber 32. The rear end surface of the first optical fiber shown in FIG. 6B is formed so as to be perpendicular to the optical axis positioned at the center of the first optical fiber.

Hereinafter, the built-in optical fiber of the optical connector, that is, the optical fiber, which is referred to as the first optical fiber optically connected to the second optical fiber using the mechanical splice (for example, the optical fiber connector shown in FIGS. 6A and 6B) and to which the solid refractive index matching material is attached, is referred to as a target optical fiber having a matching material. For example, the tip surface of the target optical fiber having a matching material to which the solid refractive index matching material is attached may be an inclined surface (flat surface, and hereinafter, also referred to as an inclined tip surface) which is inclined by approximately 7 to 9 degrees with respect to a virtual perpendicular surface perpendicular to the optical axis of the center built-in optical fiber.

When the solid refractive index matching material having a partially spherical shape is provided on the inclined tip surface, the apex of the solid refractive index matching material having a partially spherical shape is formed in a convex shape, which is positioned on a straight line of the inclined tip surface orthogonal to the position of the optical axis of the target optical fiber having a matching material, on the inclined tip surface. Meanwhile, also in this case, the thickness D of the solid refractive index matching material with respect to the tip surface of the target optical fiber having a matching material indicates a coating thickness positioned on the extension of the optical axis of the center on the tip surface of the target optical fiber having a matching material.

When the tip surface of the target optical fiber having a matching material is the perpendicular rear end surface or a partially spherical shape which has been subjected to PC grinding, the tip surface of the second optical fiber optically connected to the target optical fiber having a matching material is formed so as to be perpendicular to the optical axis of the center insertion side bare optical fiber. In addition, when the tip surface of the target optical fiber having a matching material is an inclined tip surface, preferably, the tip surface of the second optical fiber is a flat inclined surface which is inclined with respect to a virtual plane perpendicular to the optical axis of the tip of the second optical fiber at an inclination angle which approximately coincides with the inclination angle with respect to a virtual perpendicular surface perpendicular to the optical axis of the center on the inclined tip surface of the target optical fiber having a matching material.

The solid refractive index matching material 321 can appropriately use the solid refractive index matching material 321 of the region R1 shown in FIG. 7 regardless of the configuration of the tip surface of the target optical fiber having a matching material. In addition, when the holes-including optical fiber 1A is used as the second optical fiber, the solid refractive index matching material 321 of the region R2 (Shore hardness E is 45 or more and 80 or less) shown in FIG. 7 can be appropriately used regardless of the configuration of the tip surface of the target optical fiber having a matching material The fiber-fixing portion of the optical fiber connector may adopt any configuration as long as the first optical fiber can be fixed to the base member, and is not limited to the configurations which are described in the embodiments.

The element portion of the clamp portion of the clamp portion-attached ferrule is not limited to the above-described configuration which is configured of the base side element 35 fixed to the ferrule 31, and the cover side element 36 including two members of the front element 361 and the rear element 362, and may use a configuration in which one member is provided as the cover side element.

In addition, the present invention is not limited to the configuration in which the aligning groove is formed on the base side element, and may also use a configuration in which the aligning groove is formed on the cover side element.

The housing of the optical connector accommodating the clamp portion-attached ferrule is not particularly limited. For example, a configuration, in which an interposing member insertion hole is formed in a housing such as a SC type optical connector, a so-called SC2 type optical connector (a knob is omitted from the SC type optical connector), or a MU type optical connector, or the like may be used.

In the above-described embodiments, the optical connector (interposing member attached optical connector) having the configuration in which the interposing member is interposed between the elements in advance and the portion between the elements is opened is exemplified. However, the optical connector is not limited to this, and may also utilize a configuration in which the interposing member is not inserted into the portion between the elements of the clamp portion of the clamp portion-attached ferrule, and the operation of inserting the interposing member into the portion between the elements and opening the portion between the elements is performed when the operation of inserting the insertion optical fiber into the portion between the elements is performed.

Hereinbefore, preferred embodiments of the present invention have been described. However, the embodiments are examples, and it should be understood that the present invention is not limited to the embodiments. Addition, omission, replacement, and other modifications may be performed without departing from the scope of the present invention. Accordingly, the present invention is not limited by the above-described explanation, and is only limited by the claims.

What is claimed is:

1. An optical fiber connection structure comprising:
a first optical fiber having a rear end surface on which a solid refractive index matching material formed of a light-transmitting polymer material is provided;
a second optical fiber which is optically connected to the first optical fiber via the solid refractive index matching material of the first optical fiber;
a clamp portion, which comprises a base member and a cover member which can be opened and closed with respect to the base member, and which is configured to hold and fix a rear end portion of the first optical fiber and a tip of the second optical fiber between the base member and the cover member;
a liquid refractive index matching agent which is provided on a side of the base member of the clamp portion facing the cover member; and
wherein the solid refractive index matching material functions as a cushion layer so that a portion between the tip of the second optical fiber on which irregularities are formed and the rear end surface of the first optical fiber can be embedded with the solid refractive index matching material,
wherein the solid refractive index matching material is formed so that a thickness of the solid refractive index matching material at a core portion of the first optical fiber is a maximum thickness in the whole solid refractive index matching material covering the rear end surface of the first optical fiber,
wherein the liquid refractive index matching material has a viscosity for stably maintaining an attachment state with respect to the base member without having fluidity with respect to the clamp portion regardless of a connection structure orientation,
wherein the tip of the second optical fiber is disposed so as to come into contact with the solid refractive index matching material or be separated from the solid refractive index matching material, and
wherein the entire solid refractive index matching material and the tip of the second optical fiber are both embedded in the liquid refractive index matching agent.

2. The optical fiber connection structure according to claim 1,
wherein the solid refractive index matching material comprises a partially spherical shape, and an apex of the partially spherical shape is positioned on an optical axis of a tip of the first optical fiber.

3. An optical fiber connector, comprising:
a fiber-fixing portion;
a first optical fiber which has a rear end surface on which a solid refractive index matching material formed of a light-transmitting polymer material is provided, which is fixed to the fiber-fixing portion, and which comprises an extended portion extending from the fiber-fixing portion;

a second optical fiber which is optically connected to the first optical fiber via the solid refractive index matching material of the first optical fiber;

a clamp portion which comprises a base member and a cover member which can be opened and closed with respect to the base member, and which is configured to hold and fix the extended portion between the base member and the cover member;

a solid refractive index matching material which is provided on a tip surface of the extended portion ;

a liquid refractive index matching agent which is provided between the base member and the cover member, and which is configured to bury the entire solid refractive index matching material; and a second optical fiber, which is inserted between the base member and the cover member , in which a tip of the second optical fiber is disposed in the liquid refractive index matching agent, and which is configured to be optically connected to the first optical fiber via the solid refractive index matching material, wherein the solid refractive index matching material functions as a cushion layer so that a portion between the tip of the second optical fiber on which irregularities are formed and the rear end surface of the first optical fiber can be embedded with the solid refractive index matching material, wherein the solid refractive index matching material is formed so that a thickness of the solid refractive index matching material at a core portion of the first optical fiber is a maximum thickness in the whole solid refractive index matching material covering the rear end surface of the first optical fiber, wherein the liquid refractive index matching material has a viscosity for stably maintaining an attachment state with respect to the base member without having fluidity with respect to the clamp portion regardless of a connection structure orientation.

4. The optical fiber connector according to claim 3, wherein the fiber-fixing portion is a ferrule to which the first optical fiber is inwardly inserted and fixed, and wherein the base member is integrally provided on the ferrule.

5. The optical fiber connector according to claim 3, wherein the solid refractive index matching material comprises a partially spherical shape, and an apex of the partially spherical shape is positioned on an optical axis of a tip of the first optical fiber.

6. The optical fiber connector according to claim 4, wherein the solid refractive index matching material comprises a partially spherical shape, and an apex of the partially spherical shape is positioned on an optical axis of a tip of the first optical fiber.

* * * * *